(12) United States Patent
Friend et al.

(10) Patent No.: US 10,476,072 B2
(45) Date of Patent: Nov. 12, 2019

(54) ELECTRODES FOR METAL-ION BATTERIES

(71) Applicant: NEXEON LIMITED, Oxfordshire (GB)

(72) Inventors: Christopher Friend, Oxfordshire (GB); Tsuyonobu Hatazawa, Yokohama (JP)

(73) Assignee: Nexeon Limited, Abingdon, Oxfordshire (GB)

(*) Notice: Subject to any disclaimer, the term of this patent is extended or adjusted under 35 U.S.C. 154(b) by 0 days.

(21) Appl. No.: 15/533,633

(22) PCT Filed: Dec. 14, 2015

(86) PCT No.: PCT/GB2015/053984
§ 371 (c)(1),
(2) Date: Jun. 6, 2017

(87) PCT Pub. No.: WO2016/092335
PCT Pub. Date: Jun. 16, 2016

(65) Prior Publication Data
US 2017/0346079 A1   Nov. 30, 2017

(30) Foreign Application Priority Data

Dec. 12, 2014   (GB) .................................. 1422160.0

(51) Int. Cl.
*H01M 4/134* (2010.01)
*H01M 4/36* (2006.01)
(Continued)

(52) U.S. Cl.
CPC ........... *H01M 4/364* (2013.01); *H01M 4/386* (2013.01); *H01M 4/387* (2013.01); *H01M 4/625* (2013.01); *H01M 2004/027* (2013.01)

(58) Field of Classification Search
CPC ...... H01M 4/364; H01M 4/625; H01M 4/387; H01M 4/587; H01M 4/386; H01M 2004/027
See application file for complete search history.

(56) References Cited

U.S. PATENT DOCUMENTS

| 4,002,541 A | 1/1977 | Streander |
| 4,192,720 A | 3/1980 | Bucker et al. |

(Continued)

FOREIGN PATENT DOCUMENTS

| CN | 1569623A A | 1/2005 |
| CN | 1967910 A | 5/2007 |

(Continued)

OTHER PUBLICATIONS

Bang, B.M. et al., Scalable Approach to Multi-Dimensional Bulk Si Anodes via Metal-Assisted Chemical Etching, Energy & Environmental Science, 4:5013-5019 (2011).

(Continued)

*Primary Examiner* — Cynthia K Walls
(74) *Attorney, Agent, or Firm* — William R. Haulbrook; Michael D. Schmitt; Choate, Hall & Stewart LLP

(57) ABSTRACT

An electrode for a metal-ion battery is provided wherein the active layer of the electrode comprises a plurality of porous particles comprising an electroactive material selected from silicon, germanium, tin, aluminium and mixtures thereof and a plurality of carbon particles selected from one or more of graphite, soft carbon and hard carbon. The ratio of the $D_{50}$ particles size of the carbon particles to the $D_{50}$ particle diameter of the porous particles is in the range of from 1.5 to 30. Also provided are rechargeable metal-ion batteries comprising said electrode and compositions of porous particles and carbon particles which may be used to prepare the active layer of said electrode.

28 Claims, 1 Drawing Sheet

(51) Int. Cl.
*H01M 4/38* (2006.01)
*H01M 4/62* (2006.01)
*H01M 4/02* (2006.01)

(56) References Cited

U.S. PATENT DOCUMENTS

| | | | |
|---|---|---|---|
| 4,363,708 A | 12/1982 | Rauchle et al. | |
| 4,686,013 A | 8/1987 | Pensabene et al. | |
| 5,395,711 A | 3/1995 | Tahara et al. | |
| 5,514,495 A | 5/1996 | Klaus | |
| 5,658,691 A | 8/1997 | Suzuki et al. | |
| 5,914,183 A | 6/1999 | Canham | |
| 6,132,724 A | 10/2000 | Blum | |
| 6,190,951 B1 | 2/2001 | Nakahori et al. | |
| 6,300,013 B1 * | 10/2001 | Yamada | H01M 4/13 429/231.8 |
| 6,334,939 B1 | 1/2002 | Zhou et al. | |
| 6,514,395 B2 | 2/2003 | Zhou et al. | |
| 7,138,208 B2 | 11/2006 | Tanjo et al. | |
| 7,244,513 B2 | 7/2007 | Li et al. | |
| 7,311,999 B2 | 12/2007 | Kawase et al. | |
| 7,332,339 B2 | 2/2008 | Canham | |
| 7,402,829 B2 | 7/2008 | Green | |
| 7,479,351 B2 | 1/2009 | Matsubara et al. | |
| 7,615,206 B2 | 11/2009 | Sandhage et al. | |
| 7,638,239 B2 | 12/2009 | Sato et al. | |
| 7,713,849 B2 | 5/2010 | Habib et al. | |
| 7,824,801 B2 | 11/2010 | Kogetsu et al. | |
| 7,851,086 B2 | 12/2010 | Matsubara et al. | |
| 7,879,734 B2 | 2/2011 | Fukutani et al. | |
| 8,080,337 B2 | 12/2011 | Higuchi et al. | |
| 8,526,166 B2 | 9/2013 | Choi et al. | |
| 8,585,918 B2 | 11/2013 | Green et al. | |
| 8,597,831 B2 | 12/2013 | Green et al. | |
| 8,772,174 B2 | 7/2014 | Green et al. | |
| 8,940,192 B2 | 1/2015 | Toyokawa | |
| 8,940,437 B2 | 1/2015 | Green et al. | |
| 8,945,431 B2 | 2/2015 | Schulz et al. | |
| 8,999,583 B2 | 4/2015 | Hirose et al. | |
| 9,252,426 B2 | 2/2016 | Green | |
| 9,548,489 B2 | 1/2017 | Abdelsalam et al. | |
| 9,774,031 B2 | 9/2017 | Yoo et al. | |
| 10,077,506 B2 | 9/2018 | Friend et al. | |
| 10,090,513 B2 | 10/2018 | Canham et al. | |
| 10,103,379 B2 | 10/2018 | Macklin et al. | |
| 2001/0044045 A1 | 11/2001 | Sato et al. | |
| 2002/0037433 A1 | 3/2002 | Rasmussen et al. | |
| 2002/0074972 A1 | 6/2002 | Narang et al. | |
| 2002/0121460 A1 | 9/2002 | Moy et al. | |
| 2002/0148727 A1 | 10/2002 | Zhou et al. | |
| 2002/0164479 A1 | 11/2002 | Matsubara et al. | |
| 2003/0054250 A1 | 3/2003 | Kweon et al. | |
| 2003/0099883 A1 | 5/2003 | Ochoa et al. | |
| 2003/0150378 A1 | 8/2003 | Winterton et al. | |
| 2003/0215711 A1 | 11/2003 | Aramata et al. | |
| 2004/0052867 A1 | 3/2004 | Canham | |
| 2004/0062990 A1 | 4/2004 | Shimamura et al. | |
| 2004/0140222 A1 | 7/2004 | Smedley et al. | |
| 2004/0166319 A1 | 8/2004 | Li et al. | |
| 2004/0185341 A1 * | 9/2004 | Yamamoto | H01M 4/02 429/209 |
| 2004/0214085 A1 | 10/2004 | Sheem et al. | |
| 2005/0031958 A1 | 2/2005 | Fukuoka et al. | |
| 2005/0186378 A1 | 8/2005 | Bhatt | |
| 2005/0186474 A1 | 8/2005 | Jiang et al. | |
| 2005/0233213 A1 | 10/2005 | Lee et al. | |
| 2006/0019151 A1 | 1/2006 | Imachi et al. | |
| 2006/0099495 A1 | 5/2006 | Suzuki et al. | |
| 2006/0102473 A1 * | 5/2006 | Bito | H01M 4/134 204/293 |
| 2006/0147802 A1 | 7/2006 | Yasuda et al. | |
| 2006/0166098 A1 | 7/2006 | Tabuchi et al. | |
| 2006/0216603 A1 | 9/2006 | Choi | |
| 2006/0251561 A1 | 11/2006 | Farrell et al. | |
| 2007/0011102 A1 | 1/2007 | Matsuhira et al. | |
| 2007/0020521 A1 | 1/2007 | Obrovac et al. | |
| 2007/0031733 A1 | 2/2007 | Kogetsu et al. | |
| 2007/0054190 A1 | 3/2007 | Fukui et al. | |
| 2007/0077490 A1 | 4/2007 | Kim et al. | |
| 2007/0099081 A1 | 5/2007 | Matsuda et al. | |
| 2007/0105017 A1 | 5/2007 | Kawase et al. | |
| 2007/0111101 A1 | 5/2007 | Ohkubo et al. | |
| 2007/0111102 A1 | 5/2007 | Inoue et al. | |
| 2007/0122708 A1 | 5/2007 | Shimamura et al. | |
| 2007/0224508 A1 | 9/2007 | Aramata et al. | |
| 2007/0255198 A1 | 11/2007 | Leong et al. | |
| 2007/0281216 A1 | 12/2007 | Petrat et al. | |
| 2008/0038170 A1 | 2/2008 | Sandhage et al. | |
| 2008/0062616 A1 | 3/2008 | Matsuda et al. | |
| 2008/0090152 A1 | 4/2008 | Kosuzu et al. | |
| 2008/0096101 A1 | 4/2008 | Bito et al. | |
| 2008/0113269 A1 | 5/2008 | Yamamoto et al. | |
| 2008/0124631 A1 | 5/2008 | Fukui et al. | |
| 2008/0145752 A1 | 6/2008 | Hirose et al. | |
| 2008/0145757 A1 | 6/2008 | Mah et al. | |
| 2008/0166474 A1 | 7/2008 | Deguchi et al. | |
| 2008/0261112 A1 | 10/2008 | Nagata et al. | |
| 2008/0280207 A1 | 11/2008 | Patoux et al. | |
| 2008/0286654 A1 * | 11/2008 | Sawa | H01M 4/364 429/231.8 |
| 2008/0305395 A1 | 12/2008 | Hirose et al. | |
| 2009/0004566 A1 | 1/2009 | Shirane et al. | |
| 2009/0004568 A1 | 1/2009 | Hirose et al. | |
| 2009/0010833 A1 | 1/2009 | Rosenband et al. | |
| 2009/0029256 A1 | 1/2009 | Mah et al. | |
| 2009/0137688 A1 | 5/2009 | Yang | |
| 2009/0143227 A1 | 6/2009 | Dubrow et al. | |
| 2009/0162750 A1 * | 6/2009 | Kawakami | H01G 11/46 429/218.1 |
| 2009/0169985 A1 | 7/2009 | Yamaguchi et al. | |
| 2009/0186267 A1 | 7/2009 | Tiegs | |
| 2009/0239151 A1 | 9/2009 | Nakanishi et al. | |
| 2009/0246628 A1 | 10/2009 | Adachi et al. | |
| 2009/0253033 A1 | 10/2009 | Hirose et al. | |
| 2009/0301866 A1 | 12/2009 | Zaghib et al. | |
| 2010/0008841 A1 | 1/2010 | Rosenkilde | |
| 2010/0009261 A1 | 1/2010 | Watanabe | |
| 2010/0112442 A1 | 5/2010 | Fujikawa et al. | |
| 2010/0112451 A1 | 5/2010 | Shibutani et al. | |
| 2010/0112475 A1 | 5/2010 | Natsume et al. | |
| 2010/0143773 A1 | 6/2010 | Honbou | |
| 2010/0143798 A1 | 6/2010 | Zhamu et al. | |
| 2010/0178565 A1 | 7/2010 | Green | |
| 2010/0190061 A1 | 7/2010 | Green | |
| 2010/0190062 A1 | 7/2010 | Yamamoto et al. | |
| 2010/0196760 A1 | 8/2010 | Green | |
| 2010/0243951 A1 | 9/2010 | Watanabe et al. | |
| 2010/0266902 A1 | 10/2010 | Takano et al. | |
| 2010/0278931 A1 | 11/2010 | Ashton et al. | |
| 2010/0285358 A1 | 11/2010 | Cui et al. | |
| 2010/0285367 A1 | 11/2010 | Matsui et al. | |
| 2010/0291441 A1 | 11/2010 | Ugaji et al. | |
| 2010/0297502 A1 | 11/2010 | Zhu et al. | |
| 2010/0330418 A1 | 12/2010 | Liang et al. | |
| 2010/0330425 A1 | 12/2010 | Lopatin et al. | |
| 2011/0001097 A1 | 1/2011 | Aramata et al. | |
| 2011/0008531 A1 | 1/2011 | Mikhaylik et al. | |
| 2011/0027537 A1 | 2/2011 | Inoue et al. | |
| 2011/0039690 A1 | 2/2011 | Niu | |
| 2011/0056563 A1 | 3/2011 | Bari | |
| 2011/0067228 A1 | 3/2011 | Green | |
| 2011/0076560 A1 | 3/2011 | Scordilis-Kelley et al. | |
| 2011/0085960 A1 | 4/2011 | Mukasyan et al. | |
| 2011/0104480 A1 | 5/2011 | Malekos et al. | |
| 2011/0111135 A1 | 5/2011 | Kamiyama et al. | |
| 2011/0111279 A1 | 5/2011 | Smithyman et al. | |
| 2011/0111294 A1 | 5/2011 | Lopez et al. | |
| 2011/0123866 A1 | 5/2011 | Pan et al. | |
| 2011/0163274 A1 | 7/2011 | Plee et al. | |
| 2011/0236493 A1 | 9/2011 | Canham et al. | |
| 2011/0244328 A1 | 10/2011 | Iriyama et al. | |
| 2011/0250498 A1 | 10/2011 | Green et al. | |
| 2011/0256452 A1 | 10/2011 | Cho et al. | |
| 2011/0269019 A1 | 11/2011 | Green et al. | |

(56) References Cited

U.S. PATENT DOCUMENTS

| | | |
|---|---|---|
| 2011/0281180 A1 | 11/2011 | Kim et al. |
| 2011/0287317 A1 | 11/2011 | Nakanishi |
| 2011/0287318 A1 | 11/2011 | Loveness et al. |
| 2011/0299223 A1 | 12/2011 | Oh et al. |
| 2011/0311873 A1 | 12/2011 | Schulz et al. |
| 2012/0040242 A1 | 2/2012 | Kurasawa et al. |
| 2012/0094178 A1 | 4/2012 | Loveridge et al. |
| 2012/0100438 A1 | 4/2012 | Fasching et al. |
| 2012/0107688 A1 | 5/2012 | Loveridge |
| 2012/0121999 A1 | 5/2012 | Laurencin et al. |
| 2012/0141872 A1 | 6/2012 | Kim et al. |
| 2012/0171566 A1 | 7/2012 | Yoshitake et al. |
| 2012/0202112 A1 | 8/2012 | Yushin et al. |
| 2012/0255858 A1 | 10/2012 | Maeshima et al. |
| 2012/0315543 A1 | 12/2012 | Wata et al. |
| 2013/0004846 A1 | 1/2013 | Kim et al. |
| 2013/0040199 A1 | 2/2013 | Yamamura |
| 2013/0071750 A1 | 3/2013 | Park et al. |
| 2013/0115517 A1 | 5/2013 | Kim et al. |
| 2013/0136986 A1 | 5/2013 | Scoyer et al. |
| 2013/0157127 A1 | 6/2013 | Hirose et al. |
| 2013/0189575 A1* | 7/2013 | Anguchamy ......... C01B 33/023 429/211 |
| 2013/0196158 A1 | 8/2013 | Yoshida et al. |
| 2013/0216907 A1 | 8/2013 | Rayner et al. |
| 2013/0224583 A1 | 8/2013 | Green |
| 2013/0224606 A1 | 8/2013 | Koh et al. |
| 2013/0266865 A1 | 10/2013 | Kwon et al. |
| 2013/0337314 A1 | 12/2013 | Essaki et al. |
| 2014/0021415 A1 | 1/2014 | Kang et al. |
| 2014/0023928 A1 | 1/2014 | Jeon et al. |
| 2014/0030599 A1 | 1/2014 | Lee et al. |
| 2014/0050987 A1 | 2/2014 | Park et al. |
| 2014/0087268 A1 | 3/2014 | Kim et al. |
| 2014/0106230 A1 | 4/2014 | Kim et al. |
| 2014/0147751 A1 | 5/2014 | Yang et al. |
| 2014/0154578 A1 | 6/2014 | Yoo et al. |
| 2014/0162131 A1 | 6/2014 | Friend et al. |
| 2014/0170303 A1 | 6/2014 | Rayner et al. |
| 2014/0193711 A1 | 7/2014 | Biswal et al. |
| 2014/0235884 A1 | 8/2014 | Veinot et al. |
| 2014/0246398 A1 | 9/2014 | Zaghib et al. |
| 2014/0302396 A1 | 10/2014 | Lu et al. |
| 2014/0349183 A1 | 11/2014 | Macklin et al. |
| 2014/0349187 A1 | 11/2014 | Hirose et al. |
| 2015/0037673 A1 | 2/2015 | Zaghib et al. |
| 2015/0044571 A1 | 2/2015 | Abdelsalam et al. |
| 2015/0072240 A1 | 3/2015 | Yoo et al. |
| 2015/0079472 A1 | 3/2015 | Lin et al. |
| 2015/0086870 A1 | 3/2015 | Fukasawa et al. |
| 2015/0104705 A1 | 4/2015 | Canham et al. |
| 2015/0221936 A1 | 8/2015 | Huang |
| 2015/0280221 A1 | 10/2015 | Abdelsalam et al. |
| 2015/0303456 A1 | 10/2015 | Yoo et al. |
| 2015/0380735 A1 | 12/2015 | Tuduki et al. |
| 2016/0126538 A1 | 5/2016 | Hanelt et al. |
| 2016/0172670 A1 | 6/2016 | Friend |
| 2016/0197342 A1 | 7/2016 | Lee et al. |
| 2016/0308205 A1 | 10/2016 | Canham et al. |
| 2017/0033357 A1 | 2/2017 | Cho et al. |
| 2017/0040610 A1 | 2/2017 | Otsuka et al. |
| 2017/0047580 A1 | 2/2017 | Cho et al. |
| 2017/0047581 A1 | 2/2017 | Lu et al. |
| 2017/0133674 A1 | 5/2017 | Murphy et al. |
| 2017/0200939 A1 | 7/2017 | Murphy et al. |
| 2017/0214042 A1 | 7/2017 | Cho et al. |
| 2017/0352883 A1 | 12/2017 | Cho et al. |
| 2018/0034056 A1 | 2/2018 | Cho et al. |
| 2018/0069234 A1 | 3/2018 | Friend et al. |
| 2018/0083263 A1 | 3/2018 | Cho et al. |
| 2019/0119826 A1 | 4/2019 | Friend et al. |
| 2019/0148718 A1 | 5/2019 | Hatazawa et al. |
| 2019/0190020 A1 | 6/2019 | Park et al. |
| 2019/0198869 A1 | 6/2019 | Park et al. |

FOREIGN PATENT DOCUMENTS

| | | |
|---|---|---|
| CN | 101188281 A | 5/2008 |
| CN | 101335342 A | 12/2008 |
| CN | 101442124 A | 5/2009 |
| CN | 101471457 A | 7/2009 |
| CN | 101591478 A | 12/2009 |
| CN | 102157731 A | 8/2011 |
| CN | 103 165 870 A | 6/2013 |
| CN | 103 633 295 A | 3/2014 |
| CN | 103840140 A | 6/2014 |
| CN | 104103807 A | 10/2014 |
| CN | 105742611 A | 7/2016 |
| EP | 0281115 A2 | 9/1988 |
| EP | 1054462 A1 | 11/2000 |
| EP | 1335438 A1 | 8/2003 |
| EP | 1396894 A2 | 3/2004 |
| EP | 1427039 A2 | 6/2004 |
| EP | 1750314 A1 | 2/2007 |
| EP | 1791199 A1 | 5/2007 |
| EP | 2037516 A1 | 3/2009 |
| EP | 2051317 A1 | 4/2009 |
| EP | 2383224 A1 | 11/2011 |
| EP | 2509142 A1 | 10/2012 |
| EP | 2873646 A1 | 5/2015 |
| EP | 2879216 A1 | 6/2015 |
| EP | 2533331 B1 | 8/2015 |
| EP | 2966037 A1 | 1/2016 |
| EP | 3093910 A1 | 11/2016 |
| GB | 980513 A | 1/1965 |
| GB | 2000191 A | 1/1979 |
| GB | 2395059 A | 5/2004 |
| GB | 2464158 A | 4/2010 |
| GB | 2470056 A | 11/2010 |
| GB | 2483372 A | 3/2012 |
| GB | 2495951 A | 5/2013 |
| JP | 06-325765 A | 11/1994 |
| JP | 11-250896 | 9/1999 |
| JP | 2001-266866 A | 9/2001 |
| JP | 2002-151055 A | 5/2002 |
| JP | 2002-170561 A | 6/2002 |
| JP | 2003-077463 A | 3/2003 |
| JP | 2003-100296 A | 4/2003 |
| JP | 2003-303586 A | 10/2003 |
| JP | 2004-185984 A | 7/2004 |
| JP | 2004/214054 A | 7/2004 |
| JP | 2004281317 A | 10/2004 |
| JP | 2004-311429 A | 11/2004 |
| JP | 2005-63955 A | 3/2005 |
| JP | 2005-259697 A | 9/2005 |
| JP | 03714665 B2 | 11/2005 |
| JP | 2006-100244 A | 4/2006 |
| JP | 2006172860 A | 6/2006 |
| JP | 2006-269216 A | 10/2006 |
| JP | 2007-042285 A | 2/2007 |
| JP | 2007-080652 A | 3/2007 |
| JP | 2007-128766 A | 5/2007 |
| JP | 2007-220585 A | 8/2007 |
| JP | 2007-294423 A | 11/2007 |
| JP | 2007-335283 A | 12/2007 |
| JP | 2007318057 A | 12/2007 |
| JP | 2007335198 A | 12/2007 |
| JP | 2008-004460 A | 1/2008 |
| JP | 2008-166013 A | 7/2008 |
| JP | 2008186732 A | 8/2008 |
| JP | 4171904 B2 | 10/2008 |
| JP | 2008-293872 A | 12/2008 |
| JP | 2008305746 A | 12/2008 |
| JP | 2010-021100 A | 1/2010 |
| JP | 4401984 B2 | 1/2010 |
| JP | 2010-080196 A | 4/2010 |
| JP | 2010-218848 A | 9/2010 |
| JP | 2010205609 A | 9/2010 |
| JP | 2011-009228 A | 1/2011 |
| JP | 2011-142021 A | 7/2011 |
| JP | 2011-192629 A | 9/2011 |
| JP | 2011/198614 A | 10/2011 |
| JP | 2011-233497 A | 11/2011 |
| JP | 2012-009457 A | 1/2012 |

(56) References Cited

FOREIGN PATENT DOCUMENTS

| | | |
|---|---|---|
| JP | 2012-033317 A | 2/2012 |
| JP | 2012084521 A | 4/2012 |
| JP | 2012084522 A | 4/2012 |
| JP | 2012-178269 A | 9/2012 |
| JP | 2013/008585 A | 1/2013 |
| JP | 2013-131324 A | 7/2013 |
| JP | 2013-131325 A | 7/2013 |
| JP | 2014/082118 A | 5/2014 |
| KR | 2003-0028241 A | 4/2003 |
| KR | 100 578 871 B1 | 5/2006 |
| KR | 2008-0091883 A | 10/2008 |
| KR | 2011-0116585 A | 10/2011 |
| KR | 2012-0089512 A | 8/2012 |
| KR | 2012-0093756 A | 8/2012 |
| KR | 10-1204192 B1 | 11/2012 |
| KR | 2012-0120034 A | 11/2012 |
| KR | 2013-0031778 A | 3/2013 |
| KR | 2013-0050704 A | 5/2013 |
| KR | 2013 0107892 A | 10/2013 |
| KR | 2013-0114007 A | 10/2013 |
| KR | 10-1341951 B1 | 12/2013 |
| KR | 2013-0139554 A | 12/2013 |
| KR | 2014-0012351 A | 2/2014 |
| KR | 2014-0022679 A | 2/2014 |
| KR | 20140070227 A | 6/2014 |
| KR | 2014-0100514 A | 8/2014 |
| KR | 10-1441447 B1 | 9/2014 |
| KR | 2016-0009658 A | 1/2016 |
| SU | 471402 A1 | 3/1973 |
| SU | 544019 A | 7/1975 |
| WO | WO-97/01193 A1 | 1/1997 |
| WO | WO-2004/049473 A2 | 6/2004 |
| WO | WO-2004/086539 A1 | 10/2004 |
| WO | WO-2005/075048 A1 | 8/2005 |
| WO | WO-2005/096414 A2 | 10/2005 |
| WO | WO-2006/068066 A1 | 6/2006 |
| WO | WO-2006/097380 A1 | 9/2006 |
| WO | WO-2006/135375 A2 | 12/2006 |
| WO | WO-2007/037787 A1 | 4/2007 |
| WO | WO-2007/083152 A1 | 7/2007 |
| WO | WO-2007/083155 A1 | 7/2007 |
| WO | WO-2007/094641 A1 | 8/2007 |
| WO | WO-2008/044683 A1 | 4/2008 |
| WO | WO-2009/010758 A2 | 1/2009 |
| WO | WO-2009/010759 A1 | 1/2009 |
| WO | WO-2009/033082 A2 | 3/2009 |
| WO | WO-2009/050585 A1 | 4/2009 |
| WO | WO-2009/063801 A1 | 5/2009 |
| WO | WO-2009/089018 A2 | 7/2009 |
| WO | WO-2009/128800 A1 | 10/2009 |
| WO | WO-2010/026332 A1 | 3/2010 |
| WO | WO-2010/040985 A1 | 4/2010 |
| WO | WO-2010/128310 A1 | 11/2010 |
| WO | WO-2010/130975 A1 | 11/2010 |
| WO | WO-2010/130976 A1 | 11/2010 |
| WO | WO-2010/139987 A2 | 12/2010 |
| WO | WO-2011/042742 A1 | 4/2011 |
| WO | WO-2011/117436 A1 | 9/2011 |
| WO | WO-2012/028857 A1 | 3/2012 |
| WO | WO-2012/028858 A1 | 3/2012 |
| WO | WO-2012/084570 A1 | 6/2012 |
| WO | WO-2012/093224 A1 | 7/2012 |
| WO | WO-2012/175998 A1 | 12/2012 |
| WO | WO-2013/021630 A1 | 2/2013 |
| WO | WO-2013/024305 A2 | 2/2013 |
| WO | WO-2013/049939 A1 | 4/2013 |
| WO | WO-2013/114094 A1 | 8/2013 |
| WO | WO-2013/128201 A1 | 9/2013 |
| WO | WO-2013/140177 A2 | 9/2013 |
| WO | WO-2013/146658 A1 | 10/2013 |
| WO | WO-2013/179068 A2 | 12/2013 |
| WO | WO-2013/179068 A3 | 1/2014 |
| WO | WO-2014/068318 A1 | 5/2014 |
| WO | WO-2014/156117 A1 | 10/2014 |
| WO | WO-2015/03996 A1 | 1/2015 |
| WO | WO-2015/041450 A1 | 3/2015 |
| WO | WO-2015/082920 A1 | 6/2015 |
| WO | WO-2015/157358 A1 | 10/2015 |
| WO | WO-2016/102098 A1 | 6/2016 |
| WO | WO-2016/102208 A1 | 6/2016 |
| WO | WO-2016/174023 A1 | 11/2016 |

OTHER PUBLICATIONS

Chartier, C. et al., Metal-assisted chemical etching of silicon in HF-H2O2, Electrochimica Acta, 53(17):5509-5516 (2008).
Chen et al., Mesoporous Silicon Anodes Prepared by Magnesiothermic Reduction for Lithium Ion Batteries, Journal of the Electrochemical Society, 158(9):A1055-A1059 (2011).
Chen, X. et al., A Patterned 3D Silicon Anode Fabricated by Electrodeposition on a Virus-Structured Current Collector, Advanced Function Materials, 21:380-387 (2011).
Choi et al., Silica nanofibres from electrospinning/sol-gel process, J. Mater. Sci. Letters, 22:891-893 (2003).
Cui, et al. Doping and Electrical Transport in Silicon Nanowires, Journal of Physical Chemistry, 104(22):5213-5216 (2000).
Cullis et al., Structural and Luminescence properties of porous silicon, Applied Physics Reviews, 82(3):909-965 (1997).
Gao et al., Alloy formation in Nanostructured Silicon, Journal of Advanced Materials, 13(11):816-819 (2001).
Gao, B, Synthesis and Electrochemical Properties of Carbon Nanotubes and Silicon Nanowires, Ph.D. Thesis in Applied and Material Sciences, University of North Carolina Chapel Hill (2001).
GB Patent Application No. 0601319.7, filed Jan. 23, 2006, 14 pages.
Graetz, J. et al., Highly reversible lithium storage in nanostructured silicon, Journal of the Electrochemical Society, 6(9):194-197 (2003).
Hatchard, T. D. and Dahn, J. R., In Situ XRD and Electrochemical Study of the Reaction of Lithium with Amorphous Silicon, Journal of The Electrochemical Society, 151(6):A838-A842 (2004).
Huang, Z. et al., Metal-Assisted Chemical Etching of Silicon: A Review, Adv. Mater. 23:285-308 (2011).
International Search and Examination Report, GB1219729.9, 9 pages, dated Mar. 20, 2013.
International Search Report, Application No. GB1414634.4, dated Mar. 9, 2015, 2 pages.
International Search Report, PCT/GB2012/051475, 5 pages (dated Sep. 19, 2012).
International Search Report, PCT/GB2012/052020, 7 pages, dated Apr. 23, 2014.
International Search Report, PCT/GB2013/050189, 4 pages (dated May 22, 2013).
International Search Report, PCT/GB2013/050190, 4 pages (dated May 10, 2013).
International Search Report, PCT/GB2013/051472, 8 pages, dated Oct. 12, 2013.
International Search Report, PCT/GB2013/052846, 3 pages, dated Mar. 11, 2014.
International Search Report, PCT/GB2014/052398, 3 pages, dated Nov. 5, 2014.
International Search Report, PCT/GB2014/053594, 6 pages, dated May 22, 2015.
International Search Report, PCT/GB2015/053984, 4 pages, dated Mar. 31, 2016.
Jia et al., Novel Three-Dimensional Mesoporous Silicon for High Power Lithium-Ion Battery Anode Material, Advs. Energy Mater., 1:1036-1039 (2011).
Jung, K. H. et al., Developments in Luminescent Porous Si, J. Electrochem. Soc., 140(10):3046-3064 (1993).
Krissanasaeranee et al., Preparation of Ultra-Fine Silica Fibers Using Electrospun Ply(Vinyl Alcohol)/Silatrane Composite Fibers as Precursor, J. Am. Ceram. Soc., 91(9):2830-2835 (2008).
Kuriyama, K. et al., Anomalous electrical resistivity and photovoltaic phenomenon in the fast mixed conductor lithium silicide Li12Si17, Physical Review, 38(18):1436-38 (1988).
Lestriez, B. et al., Hierarchical and Resilient Conduction Network of Bridged Carbon Nanotubes and Nanofibers for High-Energy Si Negative Electrodes, Electrochemical and Solid-State Letters, 12(4):76-80 (2009).

(56) References Cited

OTHER PUBLICATIONS

Li, H. et al., The crystal structural evolution of nano-Si anode caused by lithium insertion and extraction at room temperature, Solid State Ionics 135:181-191 (2000).
Ma et al., Silver nanoparticles decorated, flexible $SiO_2$ nanofibers with long-term antibacterial effect as reusable wound cover, Colloids and Surfaces A: Physicochem. Eng. Aspects 387:57-64 (2011).
Mallet, J. et al., Growth of silicon nanowires of controlled diameters by electrodeposition in ionic liquid at room temperature, Nanoletters, 8(10):3468-3474 (2008).
Meijer, J.A. et al., Electrical resistivity and 7Li Knight shift of liquid Li-Si alloys, J. Phys. Condens. Matter I, 5283-5289 (1989).
Merriam Webster, Definition of Particle, 1 page.
Morales, Alfredo M. and Lieber, Charles M., A Laser Ablation Method for the Synthesis of Crystalline Semiconductor Nanowires, Science, 279(9):208-211 (1998).
Notice of Opposition, EP 2533331 B1, 6 pages, dated May 27, 2016.
Ohara, S. et al., A thin film silicon anode for Li-ion batteries having a very large specific capacity and long cycle life, Journal of Power Sources, (136):303-306 (2004).
Oudenhoven, Jos F. M. et al., All-solid-State Lithium-Ion Microbatteries: A Review of Various Three-Dimensional Concepts, Adv. Energy Mater. 1:10-33 (2011).
Purkid et al., Synthesis and Characterization of $SiO_2$ Nanowires Prepared from Rice Husk Ash, J. Metals, Materials and Minerals, 19(2):33-37 (2009).
Richman et al., Ordered Mesoporous Silicon through Magensium Reduction of Polymer Templated Silica Thin Films, Nano Lett., 8(9):3075-3079 (2008).
Robinson, D. and Walsh, F.C., The Performance of a 500 Amp Rotating Cylinder Electrode Reactor. Part 1: Current-Potential Data and Single Pass Studies, Hydrometallurgy, 26:93 (1991).
Rongguan, L. et al., Electrodeposited porous-microspheres Li-Si films as negative electrodes in lithium-ion batteries, Journal of Power Sources, 196(8):3868-3873 (2011).
Schmuck, M. et al, Alloying of electrodeposited silicon with lithium—a principal study of applicability as a node material for lithium ion batteries, J. Solid State Electrochem, 14:2203-2207 (2010).
Search Report, GB0818645.4, 2 pages (dated Jan. 25, 2010).
Search Report, GB1110785.1, 2 pages (dated Jan. 11, 2012).
Search Report, GP1201540.0, 1 page (dated Apr. 19, 2012).
Search Report, GP1201541.8, 1 page (dated Apr. 17, 2012).
Shih, S. et al., Transmission electron microscopy study of chemically etched porous Si, Applied Physical Letters, 62(5):467-69 (1993).
Shin, H. C. et al., Nanoporous Structures Prepared by an Electrochemical Deposition Process, Advanced Materials, 15:19, 1610-1614 (2003).
Sinha, S. et al., Synthesis of Silicon Nanowires and Novel Nano-Dendrite Structures, CP544 Electronic Properties of Novel Materials Molecular Nanostructures, 431-436 (2000).
Sinha, S. et al., Synthesis of silicon nanowires and novel nano-dendrite structures, Journal of Nanoparticle Research 6: 421-425 (2004).
Tarascon, J M. et al., An update of the Li metal-free rechargeable battery based on $Li_{1+x}Mn_2 O_4$ cathodes and carbon anodes, Journal of Power Sources, 43-44:689-700 (1993).
Teschke, O. et al., Test cell simulating the operating conditions of water electrolysers for the evaluation of gas evolving electrocatalysts, Journal of Applied Electrochemistry, 13(3):371-376 (1983).
United Kingdom Search Report, GB1114266.8, dated Dec. 22, 2011, 2 pages.
United Kingdom Search Report, GB1203447.6, dated Jun. 25, 2012, 2 pages.
United Kingdom Search Report, GB1209843.0, dated Jul. 23, 2012, 1 page.
Van Schalkwijk, Walter A. and Scrosati, Bruno, Advances in Lithium-Ion Batteries (edited 2002 Excerpts).
Wachtler, M. et al., Anodic materials for rechargeable Li-batteries, Journal of Power Sources 105:151-160 (2002).
Wakihara, M., Recent development in lithium ion batteries, Materials Science and Engineering, R33:109-134 (2001).
Webb, P.A. and Orr, C., Modern Methods of Particle Characterization, Micromeritics, 17 pages (1998).
Winter, M. et al., Insertion Electrode Materials for Rechargeable Lithium Batteries, Adv. Mater. 10(10):725-763 (1988).
Winter, Martin and Brodd, Ralph J., Batteries versus Fuel Cells versus Electrochemical Capacitors, Chem. Rev. 104:4245-4269 (2004).
Written Opinion, PCT/GB2014/052398, dated Nov. 5, 2014.
Written Opinion, PCT/GB2015/053984, 6 pages, dated Mar. 31, 2016.
Xiao, et al., Stabilization of Silicon Anode for Li-ion Batteries, Journal of the Electrochemical Society, 157(10):1047-1051 (2010).
Yang, J. et al., Si/c composites for high capacity lithium storage materials, Journal of the Electrochemical Society, 6(8):154-156 (2003).
Yu et al., Reversible Storage of Lithium in Silver-Coated Three-Dimensional Macroporous Silicon, Adv. Mater., 22:2247-2250 (2010).
Zhang et al., Vapor-induced solid-liquid-solid process for silicon-based nanowire growth, Journal of Power Sources 195:1691-1697 (2010).
Zhang, Sheng Shui, A review on electrolyte additives for lithium-ion batteries, Journal of Power Sources, 162:1379-1394 (2006).
Zhou, G. W. et al., Controlled Li doping of Si nanowires by electrochemical insertion methods, Applied Physics Letters, 75(16):2447-2449 (1999).
Ren, W. et al., Preparation of porous silicon/carbon microspheres as high performance anode materials for lithium ion batteries, Journal of Materials Chemistry A: Materials for Energy and Sustainability, 3(11):5859-5865 (2015).
Abel, P. R. et al., Improving the Stability of Nanostructured Silicon Thin Film Lithium-Ion Battery Anodes through Their Controlled Oxidation, ACS Nano, 6(3):2506-2516, (2012).
Jung, S. C. et al., Anisotropic Volume Expansion of Crystalline Silicon during Electrochemical Lithium Insertion: An Atomic Level Rationale, Nano Letters, 12:5342-5347, (2012).
Park, M. H. et al., Silicon Nanotube Battery Anodes, Nano Letters, 9(11):3844-3847 (2009).
Stoemenos, J. et al., Silicon on Insulator Obtained by High Dose Oxygen Implantation, Microstructure, and Formation Mechanism, J. Electrochem. Soc., 142(4):1248-1260, (1995).
Su, L. et al., Core Double-shell $Si@SiO_2@C$ nanocomposites as anode materials for Li-ion batteries, Chemical Communication, 46:2590-2592 (2010).
Xu, R. et al., Comparison of sizing small particles using different technologies, Powder Technology, 132:145-153, (2003).

\* cited by examiner

ELECTRODES FOR METAL-ION BATTERIES

This invention relates in general to electrode compositions for metal-ion batteries and more specifically to hybrid electrode compositions comprising carbon particles and at least one other particulate electroactive material. Also provided are electrodes comprising the electrode compositions, metal-ion batteries comprising the electrodes and methods of making the electrodes.

Rechargeable metal-ion batteries are widely used in portable electronic devices such as mobile telephones and laptops and are finding increasing application in electric or hybrid vehicles. Rechargeable metal-ion batteries generally comprise an anode layer, a cathode layer, an electrolyte to transport metal ions between the anode and cathode layers, and an electrically insulating porous separator disposed between the anode and the cathode. The cathode typically comprises a metal current collector provided with a layer of metal ion containing metal oxide based composite, and the anode typically comprises a metal current collector provided with a layer of an electroactive material, defined herein as a material which is capable of inserting and releasing metal ions during the charging and discharging of a battery.

For the avoidance of doubt, the terms "cathode" and "anode" are used herein in the sense that the battery is placed across a load, such that the cathode is the positive electrode and the anode is the negative electrode. When a metal-ion battery is charged, metal ions are transported from the metal-ion-containing cathode layer via the electrolyte to the anode and are inserted into the anode material. The term "battery" is used herein to refer both to a device containing a single anode and a single cathode and to devices containing a plurality of anodes and/or a plurality of cathodes.

There is interest in improving the gravimetric and/or volumetric capacities of rechargeable metal-ion batteries. The use of lithium-ion batteries has already provided a substantial improvement when compared to other battery technologies, but there remains scope for further development. To date, commercial metal-ion batteries have largely been limited to the use of graphite as an anode active material. When a graphite anode is charged, lithium intercalates between the graphite layers to form a material with the empirical formula $Li_xC_6$ (wherein x is greater than 0 and less than or equal to 1). Consequently, graphite has a maximum theoretical capacity of 372 mAh/g in a lithium-ion battery, with a practical capacity that is somewhat lower (ca. 320 to 360 mAh/g). Other materials, such as silicon, tin and germanium, are capable of intercalating lithium with a significantly higher capacity than graphite but have yet to find widespread commercial use due to difficulties in maintaining sufficient capacity over numerous charge/discharge cycles.

Silicon in particular is attracting increasing attention as a potential alternative to graphite for the manufacture of rechargeable metal-ion batteries having high gravimetric and volumetric capacities because of its very high capacity for lithium (see, for example, Insertion Electrode Materials for Rechargeable Lithium Batteries, Winter, M. et al. in Adv. Mater. 1998, 10, No. 10). At room temperature, silicon has a theoretical capacity in a lithium-ion battery of about 3,600 mAh/g (based on $Li_{15}Si_4$). However its use as an electroactive material is complicated by large volumetric changes on charging and discharging. Insertion of lithium into bulk silicon (or alloying of silicon) leads to a large increase in the volume of the silicon material, up to 400% of its original volume when silicon is lithiated to its maximum capacity, and repeated charge-discharge cycles cause significant mechanical strain in the silicon material, resulting in fracturing and delamination of the silicon anode material. Loss of electrical contact between the anode material and the current collector results in a significant loss of capacity in subsequent charge-discharge cycles.

The use of germanium as an electroactive material is associated with similar problems. Germanium has a maximum theoretical capacity of 1625 mAh/g in a lithium-ion battery. However, insertion of lithium into bulk germanium results in a volume change of up to 370% when germanium is lithiated to its maximum capacity. As with silicon, the mechanical strain on the germanium material results in fracturing and delamination of the anode material and a loss of capacity.

Tin and aluminium are further examples of electroactive materials which are capable of intercalating metal ions with significantly higher volumetric and gravimetric capacities than graphite, but which are also associated with capacity loss due to expansion and contraction of the electroactive material over multiple charging and discharging cycles.

A number of approaches have been proposed to overcome the problems associated with the volume changes observed when charging silicon-containing anodes. These relate in general to silicon structures which are better able to tolerate volumetric changes than bulk silicon. For example, Ohara et al. (Journal of Power Sources 136 (2004) 303-306) have described the evaporation of silicon onto a nickel foil current collector as a thin film and the use of this structure as the anode of a lithium-ion battery. Although this approach gives good capacity retention, the thin film structures do not give useful amounts of capacity per unit area, and any improvement is eliminated when the film thickness is increased. WO 2007/083155 discloses that improved capacity retention may be obtained through the use of silicon particles having high aspect ratio, i.e. the ratio of the largest dimension to the smallest dimension of the particle. The high aspect ratio, which may be as high as 100:1 or more, is thought to help to accommodate the large volume changes during charging and discharging without compromising the physical integrity of the particles.

Other approaches relate to the use of sub-micron scale silicon structures that as not as likely to fracture during the expansion that occurs when lithium is intercalated into silicon. For example, U.S. Pat. No. 6,334,939 and U.S. Pat. No. 6,514,395 disclose silicon based nano-structures for use as anode materials in lithium ion secondary batteries. Such nano-structures include cage-like spherical particles and rods or wires having diameters in the range 1 to 50 nm and lengths in the range 500 nm to 10 μm. The silicon structures may also be arranged to include void space to provide a buffer zone for the expansion. For example U.S. Pat. No. 8,597,831 discloses an electrode comprising elongated silicon structures that cross over each other to provide intersections and a porous structure and WO 2012/175998 discloses particles comprising a plurality of silicon-containing pillars extending from a particle core which may be formed, for example, by chemical etching or by a sputtering process.

Porous silicon particles have also been investigated for use in lithium-ion batteries. Porous silicon particles are attractive candidates for use in metal-ion batteries as the cost of preparing these particles is generally less than the cost of manufacturing alternative silicon structures such as silicon fibres, ribbons or pillared particles. For example, US 2009/0186267 discloses an anode material for a lithium-ion battery, the anode material comprising porous silicon particles dispersed in a conductive matrix. The porous silicon particles have a diameter in the range 1 to 10 µm, pore diameters in the range 1 to 100 nm, a BET surface area in the range 140 to 250 m²/g and crystallite sizes in the range 1 to 20 nm. The porous silicon particles are mixed with a conductive material such as carbon black and a binder such as PVDF to form an electrode material which can be applied to a current collector to provide an electrode.

Despite the efforts to date, the lifetime performance of silicon electroactive materials needs to be significantly improved before electrodes containing high loadings of silicon could be considered commercially viable. Thus, while it remains a long term objective to commercialise batteries in which the anode electroactive material is predominantly or entirely silicon, a more immediate goal of battery manufacturers is to identify ways of using small amounts of silicon to supplement the capacity of graphite anodes. A current focus is therefore on obtaining incremental improvements to existing metal-ion battery technology through the use of "hybrid" electrodes rather than a wholesale transition from graphite anodes to silicon anodes.

The development of hybrid electrodes presents challenges of its own. Any additional electroactive material must be provided in a form which is compatible with the carbon particulate forms conventionally used in metal-ion batteries. For example, it must be possible to disperse the additional electroactive material throughout a matrix of carbon particles and the particles of the additional electroactive material must have sufficient structural integrity to withstand compounding with carbon particles and subsequent formation of an electrode layer, for example via steps such as slurry mixing, deposition, compressing, drying and calendering. Differences in the metallation properties of graphite and other electroactive materials must also be taken into account when developing hybrid anodes. In the lithiation of a graphite-containing hybrid anode in which graphite constitutes at least 50 wt % of the electroactive material, a silicon-containing electroactive material needs to be lithiated to, or close to, its maximum capacity to gain the capacity benefit from all the electroactive material. Whereas in a non-hybrid silicon electrode, the silicon material may generally be limited to ca. 25 to 60% of its maximum gravimetric capacity during charge and discharge so as to avoid placing excessive mechanical stresses (from the expansion and contraction of the active material) on the silicon material itself as well as other electrode and cell components and also to maintain an optimum overall volumetric capacity at full charge of the cell, this option is not available in hybrid electrodes. Consequently, the electroactive material must be able to withstand very high levels of mechanical stress through repeated charge and discharge cycles. As well as withstanding high stresses, the overall expansion of the electrode has to be accommodated within the cell/battery without placing stress on other components. Hence, there is a need for the additional electroactive material to be structured so that the expansion can be managed without an excessive increase in the thickness of the electrode coating.

U.S. Pat. No. 7,479,351 discloses porous silicon-containing particles containing microcrystalline silicon and having a particle diameter in the range of 0.2 to 50 µm. The particles are obtained by alloying silicon with an element X selected from the group consisting of Al, B, P, Ge, Sn, Pb, Ni, Co, Mn, Mo, Cr, V, Cu, Fe, W, Ti, Zn, alkali metals, alkaline earth metals and combinations thereof, followed by removal of the element X by a chemical treatment. U.S. Pat. No. 7,479,351 discloses that the porous silicon-containing particles may be used in combination with graphite to form a composite electrode. However, while the examples of U.S. Pat. No. 7,479,351 show that improved performance is obtained in comparison to non-porous silicon forms, the use of graphite is disclosed only in minor amounts as a conductive additive and the examples disclose only the lithiation of the silicon component of the anode.

U.S. Pat. No. 8,526,166 discloses a lithium ion capacitor that includes a hybrid anode active material comprising two types of active material particles. The first active material particles are selected from active carbon particles, such as graphite particles, and the second active material particles include a silicon oxide and have a particle size of 10 to 100 nm. According to U.S. Pat. No. 8,526,166, the nanoscale silicon oxide particles provide a greater increase in theoretical capacity and are more tolerant of volume changes on charging and discharging when compared to microscale particles. However, nanoscale particles are not particularly suitable for commercial scale applications because they are difficult to prepare and handle. For example, nanoscale particles tend to form agglomerates, making it difficult to obtain a useful dispersion of the particles within an anode material matrix. In addition, the formation of agglomerates of nanoscale particles results in an unacceptable capacity loss on repeated charge-discharge cycling.

US 2004/0214085 discloses a rechargeable lithium battery in which the negative anode active material includes an aggregate of porous silicon particles wherein the porous particles are formed with a plurality of voids having an average diameter of between 1 nm and 10 µm and wherein the aggregate has an average particle size of between 1 µm and 100 µm. The examples of US 2004/0214085 refer to graphite, but only in minor amounts as a conductive material. The use of graphite as an anode active material is not disclosed.

US 2006/0251561 discloses silicon "nanosponge" particles that are prepared by stain etching of a metallurgical grade silicon powder having an initial particle size ranging from about 1 µm to about 4 µm using a solution of HF and $HNO_3$. The resulting nanosponge particles are said to comprise nanocrystalline regions with pores having an average diameter of from 2.0 nm to 8.0 nm disposed between the nanocrystalline regions.

There remains a need in the art to identify hybrid electrodes containing graphite and at least one additional electroactive material, in which the properties of the graphite and the additional electroactive material are controlled to provide optimal compatibility between these components and thus optimum cell performance. In particular, there is a need to identify electrodes comprising graphite and at least one additional electroactive material in which the structure of the additional electroactive material is controlled such that the electroactive material may be repeatedly lithiated to its maximum capacity with minimal outward expansion and without fracturing, while also allowing good access of the electrolyte to the interior of the particles.

In a first aspect, the present invention provides an electrode for metal-ion battery, the electrode comprising an active layer in electrical contact with a current collector, wherein the active layer comprises:

(i) a plurality of porous particles comprising an electroactive material selected from silicon, germanium, tin, aluminium and mixtures thereof, wherein the porous particles have a $D_{50}$ particle diameter in the range of 0.5 to 18 µm, and an intra-particle porosity in the range of from 30 to 90%; and (ii) a plurality of carbon particles selected from one or more of graphite, soft carbon and hard carbon and having a $D_{50}$ particle diameter in the range of from 1 to 50 μm;

wherein the active layer comprises at least 50% by weight of the carbon particles (ii), and wherein the ratio of the $D_{50}$ particle diameter of the carbon particles (ii) to the $D_{50}$ particle diameter of the porous particles (i) is in the range of from 1.5 to 30.

It has been found that the hybrid electrodes of the invention have particularly advantageous properties for use in metal-ion batteries. By controlling the size ratio of the porous particles (i) and the carbon particles (ii), the porous particles (i) are advantageously located in the void spaces between the carbon particles (ii). Thus, the invention provides an increase in the capacity of the active layer compared to an active layer comprising only conventional carbon particles, while minimising any increase in the volume of the active layer. In addition, the porosity of the porous particles (i) is controlled within a range which permits at least some of the expansion of the electroactive material during insertion of metal ions to be accommodated by voids or spaces within the particle structure, thereby avoiding excessive outwards expansion of the porous particles (i), which could otherwise lead to deformation and delamination of the active layer of the electrode and/or to fracture of the porous particles. For instance, the outward volumetric expansion of the porous particles (i) defined herein on full lithiation is typically less than 80%, for example less than 50% or less than 25% of the expansion observed when a solid particle of the same volume is lithiated to its full capacity. At the same time, the porosity of the porous particles (i) is not so high that the volumetric capacity of the porous particles falls below useful limits. Furthermore, by maintaining the porosity of the porous particles (i) within the ranges set out herein, it is found that the porous particles are sufficiently robust to survive manufacture and incorporation into an electrode active layer without loss of structural integrity, particularly when electrode layers are calendered to produce a dense uniform layer, as is conventional in the art. Still further, the inventors have identified that the size of the porous particles enables the particles to be dispersed readily and without agglomeration in slurries, facilitating their incorporation into electrode materials that further comprise carbon particles. Effective dispersion of the porous particles is essential as an uneven distribution of the porous particles will lead to uneven charging and expansion of the active layer, leading to degradation of the active layer.

Silicon, germanium, tin and aluminium may be present in the porous particles (i) in combination with their oxides, for example due to the presence of a native oxide layer on the surfaces of the porous particles. As used herein, references to silicon, germanium, tin and aluminium shall be understood to include the oxides of silicon, germanium, tin and aluminium. Preferably, the oxides are present in an amount of no more than 30 wt %, more preferably no more than 25 wt %, more preferably no more than 20 wt %, more preferably no more than 15 wt %, more preferably no more than 10 wt %, more preferably no more than 5 wt %, for example no more than 4 wt %, no more than 3 wt %, no more than 2 wt % or no more than 1 wt %, based on the total amount of silicon, germanium, tin and aluminium and the oxides thereof.

The porous particles (i) preferably comprise at least 60 wt %, more preferably at least 70 wt %, more preferably at least 75 wt %, more preferably at least 80 wt %, and most preferably at least 85 wt % of the electroactive material. For example, the porous particles (i) may comprise at least 90 wt %, at least 95 wt %, at least 98 wt %, or at least 99 wt % of the electroactive material.

Preferred electroactive materials are silicon and tin. Thus, the porous particles (i) preferably comprise at least 60 wt %, more preferably at least 70 wt %, more preferably at least 75 wt %, more preferably at least 80 wt %, and most preferably at least 85 wt % of silicon or tin. For example, the porous particles (i) may comprise at least 90 wt %, at least 95 wt %, at least 98 wt %, or at least 99 wt % of silicon or tin.

A particularly preferred electroactive material is silicon. Thus, the porous particles (i) preferably comprise at least 60 wt %, more preferably at least 70 wt %, more preferably at least 75 wt %, more preferably at least 80 wt %, and most preferably at least 85 wt % of silicon. For example, the porous particles (i) may comprise at least 90 wt %, at least 95 wt %, at least 98 wt %, or at least 99 wt % of silicon.

The porous particles (i) may optionally comprise silicon or tin in combination with a minor amount of aluminium and/or germanium. For instance, the porous particles (i) may comprise at least 60 wt % silicon or tin and up to 40 wt % aluminium and/or germanium, more preferably at least 70 wt % silicon or tin and up to 30 wt % aluminium and/or germanium, more preferably at least 75 wt % silicon or tin and up to 25 wt % aluminium and/or germanium, more preferably at least 80 wt % silicon or tin and up to 20 wt % aluminium and/or germanium, more preferably at least 85 wt % silicon or tin and up to 15 wt % aluminium and/or germanium, more preferably at least 90 wt % silicon or tin and up to 10 wt % aluminium and/or germanium, and most preferably at least 95 wt % silicon or tin and up to 5 wt % aluminium and/or germanium.

Optionally, the porous particles (i) may comprise at least 0.01 wt % aluminium and/or germanium, at least 0.1 wt % aluminium and/or germanium, at least 0.5 wt % aluminium and/or germanium, at least 1 wt % aluminium, at least 2 wt % aluminium and/or germanium, or at least 3 wt % aluminium and/or germanium.

The porous particles (i) may optionally comprise a minor amount of one or more additional elements other than silicon, germanium, tin or aluminium. For instance, the porous particles (i) may comprise a minor amount of one or more additional elements selected from Sb, Cu, Mg, Zn, Mn, Cr, Co, Mo, Ni, Be, Zr, Fe, Na, Sr, P, Ru, Ag, Au and oxides thereof. Preferably the one or more additional elements, if present, are selected from one or more of Ni, Ag and Cu. The one or more additional elements may optionally be present in a total amount of no more than 40 wt %, more preferably no more than 30 wt %, more preferably no more than 25 wt %, more preferably no more than 20 wt %, more preferably no more than 15 wt %, more preferably no more than 10 wt %, and most preferably no more than 5 wt %, based on the total weight of the particulate material. Optionally, the one or more additional elements may be present in a total amount of at least 0.01 wt %, at least 0.05 wt %, at least 0.1 wt %, at least 0.2 wt %, at least 0.5 wt %, at least 1 wt %, at least 2 wt %, or at least 3 wt %, based on the total weight of the particulate material.

The porous particles (i) have a $D_{50}$ particle diameter in the range of from 0.5 μm to 18 μm. Preferably, the $D_{50}$ particle diameter of the porous particles (i) is at least 0.8 μm, at least 1 μm at least 1.5 μm, at least 2 μm, at least 2.5 μm, or at least 3 μm. Preferably, the $D_{50}$ particle diameter of the porous particles (i) is no more than 15 μm, no more than 12 μm, no more than 10 μm, no more than 8 μm, no more than 7 μm, no more than 6.5 μm, no more than 6 μm, no more than 5.5 μm, no more than 5 μm, no more than 4.5 μm, no more than 4 µm, or no more than 3.5 µm. For example, the porous particles (i) may have a $D_{50}$ particle diameter in the range of from 1 µm to 15 µm, 1 µm to 12 µm, 1 µm to 10 µm, or 1 µm to 7 µm.

The $D_{10}$ particle diameter of the porous particles (i) is preferably at least 0.1 µm, at least 0.2 µm, at least 0.3 µm at least 0.4 µm, at least 0.5 µm, at least 0.6 µm at least 0.8 µm, at least 1 µm, at least 2 µm, or at least 3 µm. Porous particles (i) having a $D_{10}$ particle diameter of at least 0.5 µm are particularly preferred as the potential for undesirable agglomeration of sub-micron sized particles is reduced, resulting in improved dispersibility of the particulate material in slurries.

When the $D_{50}$ particle diameter of the porous particles (i) is at least 1 µm, the $D_{10}$ particle diameter is preferably at least 0.5 µm, more preferably at least 1 µm. When the $D_{50}$ particle diameter of the porous particles (i) is at least 1.5 µm, the $D_{10}$ particle diameter is preferably at least 0.8 µm, more preferably at least 1 µm. When the $D_{50}$ particle diameter of the porous particles (i) is at least 2 µm, the $D_{10}$ particle diameter is preferably at least 1 µm and still more preferably at least 1.5 µm.

The $D_{90}$ particle diameter of the porous particles (i) is preferably no more than 30 µm, no more than 20 µm, no more than 15 µm, no more than 12 µm, no more than 10 µm, or no more than 8 µm.

When the $D_{50}$ particle diameter of the porous particles (i) is no more than 12 µm, the $D_{90}$ particle diameter is preferably no more than 20 µm, more preferably no more than 15 µm. When the $D_{50}$ particle diameter of the porous particles (i) is no more than 10 µm, the $D_{90}$ particle diameter is preferably no more than 15 µm, more preferably no more than 12 µm. When the $D_{50}$ particle diameter of the porous particles (i) is no more than 6 µm, the $D_{90}$ particle diameter is preferably no more than 10 µm, more preferably no more than 8 µm. When the $D_{50}$ particle diameter of the porous particles (i) is no more than 5 µm, the $D_{90}$ particle diameter is preferably no more than 7.5 µm, more preferably no more than 7 µm. When the $D_{50}$ particle diameter of the porous particles (i) is no more than 4 µm, the $D_{90}$ particle diameter is preferably no more than 6 µm, more preferably no more than 5.5 µm.

The $D_{99}$ particle diameter of the porous particles (i) is preferably no more than 40 µm, no more than 30 µm, no more than 25 µm, no more than 20 µm, no more than 15 µm, or no more than 12 µm.

When the $D_{50}$ particle diameter of the porous particles (i) is no more than 12 µm, the $D_{99}$ particle diameter is preferably no more than 30 µm, more preferably no more than 20 µm. When the $D_{50}$ particle diameter of the porous particles (i) is no more than 10 µm, the $D_{99}$ particle diameter is preferably no more than 25 µm, more preferably no more than 15 µm. When the $D_{50}$ particle diameter of the porous particles (i) is no more than 6 µm, the $D_{99}$ particle diameter is preferably no more than 15 µm, more preferably no more than 12 µm. When the $D_{50}$ particle diameter of the porous particles (i) is no more than 5 µm, the $D_{99}$ particle diameter is preferably no more than 12 µm, more preferably no more than 9 µm.

Preferably, the porous particles (i) have a narrow size distribution span. For instance, the particle size distribution span (defined as $(D_{90}-D_{10})/D_{50}$) is preferably 5 or less, 4 or less, 3 or less, 2 or less or 1.5 or less. By maintaining a narrow size distribution span, the concentration of particles in the size range found by the inventors to be most favourable for use in electrodes is maximised.

For the avoidance of doubt, the term "particle diameter" as used herein refers to the equivalent spherical diameter (esd), i.e. the diameter of a sphere having the same volume as a given particle, wherein the particle volume is understood to include the volume of the intra-particle pores. The terms "$D_{50}$" and "$D_{50}$ particle diameter" as used herein refer to the volume-based median particle diameter, i.e. the diameter below which 50% by volume of the particle population is found. The terms "$D_{10}$" and "$D_{10}$ particle diameter" as used herein refer to the 10th percentile volume-based median particle diameter, i.e. the diameter below which 10% by volume of the particle population is found. The terms "$D_{90}$" and "$D_{90}$ particle diameter" as used herein refer to the 90th percentile volume-based median particle diameter, i.e. the diameter below which 90% by volume of the particle population is found. The terms "$D_{99}$" and "$D_{99}$ particle diameter" as used herein refer to the 99th percentile volume-based median particle diameter, i.e. the diameter below which 99% by volume of the particle population is found.

Particle diameters and particle size distributions can be determined by routine laser diffraction techniques. Laser diffraction relies on the principle that a particle will scatter light at an angle that varies depending on the size the particle and a collection of particles will produce a pattern of scattered light defined by intensity and angle that can be correlated to a particle size distribution. A number of laser diffraction instruments are commercially available for the rapid and reliable determination of particle size distributions. Unless stated otherwise, particle size distribution measurements as specified or reported herein are as measured by the conventional Malvern Mastersizer 2000 particle size analyzer from Malvern Instruments. The Malvern Mastersizer 2000 particle size analyzer operates by projecting a helium-neon gas laser beam through a transparent cell containing the particles of interest suspended in an aqueous solution. Light rays which strike the particles are scattered through angles which are inversely proportional to the particle size and a photodetector array measures the intensity of light at several predetermined angles and the measured intensities at different angles are processed by a computer using standard theoretical principles to determine the particle size distribution. Laser diffraction values as reported herein are obtained using a wet dispersion of the particles in distilled water. The particle refractive index is taken to be 3.50 and the dispersant index is taken to be 1.330. Particle size distributions are calculated using the Mie scattering model.

The average aspect ratio of the porous particles (i) is preferably less than 3:1, more preferably no more than 2.5:1, more preferably no more than 2:1, more preferably no more than 1.8:1, more preferably no more than 1.6:1, more preferably no more than 1.4:1 and most preferably no more than 1.2:1. As used herein, the term "aspect ratio" refers to the ratio of the longest dimension to the shortest dimension of a two-dimensional particle projection. The term "average aspect ratio" refers to a number-weighted mean average of the aspect ratios of the individual particles in the particle population.

The porous particles (i) are preferably spheroidal in shape. Spheroidal particles as defined herein may include both spherical and ellipsoidal particles and the shape of the porous particles (i) may suitably be defined by reference to both the average aspect ratio and the average sphericity of the porous particles. Spheroidal particles are found to be particularly well-suited to dispersion in slurries without the formation of agglomerates and are readily located in the void spaces (interstices) between the carbon particles in electrode layers. The sphericity of an object is conventionally defined as the ratio of the surface area of a sphere to the surface area of the object, wherein the object and the sphere have identical volume. However, in practice it is difficult to measure the surface area and volume of individual particles at the micron scale. However, it is possible to obtain highly accurate two-dimensional projections of micron scale particles by scanning electron microscopy (SEM) and by dynamic image analysis, in which a digital camera is used to record the shadow projected by a particle. The term "sphericity" as used herein shall be understood as the ratio of the area of the particle projection to the area of a circle, wherein the particle projection and circle have identical circumference. Thus, for an individual particle, the sphericity S may be defined as:

$$S = \frac{4 \cdot \pi \cdot A_m}{(C_m)^2}$$

wherein $A_m$ is the measured area of the particle projection and $C_m$ is the measured circumference of the particle projection. The average sphericity $S_{av}$ of a population of particles as used herein is defined as:

$$S_{av} = \frac{1}{n}\sum_{i=1}^{n}\left[\frac{4 \cdot \pi \cdot A_m}{(C_m)^2}\right]$$

wherein n represents the number of particles in the population.

As used herein, the term "spheroidal" as applied to the porous particles (i) shall be understood to refer to a material having an average sphericity of at least 0.70. Preferably, the porous particles (i) have an average sphericity of at least 0.85, more preferably at least 0.90, more preferably at least 0.92, more preferably at least 0.93, more preferably at least 0.94, more preferably at least 0.95, more preferably at least 0.96, more preferably at least 0.97, more preferably at least 0.98 and most preferably at least 0.99.

It will be understood that the circumference and area of a two-dimensional particle projection will depend on the orientation of the particle in the case of any particle which is not perfectly spheroidal. However, the effect of particle orientation may be offset by reporting sphericity and aspect ratios as average values obtained from a plurality of particles having random orientation.

A number of SEM and dynamic image analysis instruments are commercially available, allowing the sphericity and aspect ratio of a particulate material to be determined rapidly and reliably. Unless stated otherwise, sphericity values as specified or reported herein are as measured by a CamSizer XT particle analyzer from Retsch Technology GmbH. The CamSizer XT is a dynamic image analysis instrument which is capable of obtaining highly accurate distributions of the size and shape for particulate materials in sample volumes of from 100 mg to 100 g, allowing properties such as average sphericity and aspect ratios to be calculated directly by the instrument.

As used herein, the term "porous particle" shall be understood as referring to a particle comprising a plurality of pores, voids or channels within a particle structure. The term "porous particle" shall be understood in particular to include particles comprising a random or ordered network of linear, branched or layered elongate structural elements, wherein interconnected void spaces or channels are defined between the elongate structural elements of the network, the elongate structural elements suitably including linear, branched or layered fibres, tubes, wires, pillars, rods, ribbons, plates, walls or flakes. Preferably the porous particles (i) have a substantially open porous structure such that substantially all of the pore volume of the porous particles is accessible to a fluid from the exterior of the particle, for instance to a gas or to an electrolyte. By a substantially open porous structure, it is meant that at least 90%, preferably at least 95%, preferably at least 98%, preferably at least 99% of the pore volume of the porous particles is accessible from the exterior of the particles.

The porous particles (i) may be distinguished in some embodiments by a specific microstructure or architecture of the structural elements that constitute the porous particles. Preferably, the porous particles (i) comprise a network of interconnected irregular elongate structural elements comprising the electroactive material which may be described as acicular, flake-like, dendritic, or coral-like. This particle architecture is associated with an interconnected network of pores, preferably with a substantially even distribution of the pores throughout the particle.

Intra-particle porosity is defined herein as the ratio of the volume of pores within a particle to the total volume of the particle. Inter-particle porosity is the volume of pores between discrete particles and is a function both of the size and shape of the individual particles and of the packing density of the particles in the active layer.

The intra-particle porosity of the porous particles is preferably in the range of 35 to 90%, and more preferably in the range of 40 to 90%.

The intra-particle porosity of the porous particles (i) is preferably at least 45%, and may be at least 50%, at least 60%, or at least 70%. The intra-particle porosity of the porous particles (i) is preferably no more than 89%, more preferably no more than 88%, more preferably no more than 87%, more preferably no more than 86%, and most preferably no more than 85%. For example, the intra-particle porosity of the porous particles (i) may be no more than 80%, no more than 75%, no more than 70%, no more than 65%, no more than 60%, no more than 55% or no more than 50%.

Where the porous particles (i) are prepared by removal of an unwanted component from a starting material, e.g. by leaching of an alloy as discussed in further detail below, the intra-particle porosity can suitably be determined by determining the elemental composition of the particles before and after leaching and calculating the volume of material that is removed.

More preferably, the intra-particle porosity of the porous particles (i) may be measured by mercury porosimetry. Mercury porosimetry is a technique that characterises the porosity of a material by applying varying levels of pressure to a sample of the material immersed in mercury. The pressure required to intrude mercury into the pores of the sample is inversely proportional to the size of the pores. More specifically, mercury porosimetry is based on the capillary law governing liquid penetration into small pores. This law, in the case of a non-wetting liquid such as mercury, is expressed by the Washburn equation:

$$D = (1/P) \cdot 4\gamma \cdot \cos\varphi$$

wherein D is pore diameter, P is the applied pressure, $\gamma$ is the surface tension, and $\omega$ is the contact angle between the liquid and the sample. The volume of mercury penetrating the pores of the sample is measured directly as a function of the applied pressure. As pressure increases during an analysis, pore size is calculated for each pressure point and the corresponding volume of mercury required to fill these pores is measured. These measurements, taken over a range of pressures, give the pore volume versus pore diameter distribution for the sample material. The Washburn equation assumes that all pores are cylindrical. While true cylindrical pores are rarely encountered in real materials, this assumption provides sufficiently useful representation of the pore structure for most materials. For the avoidance of doubt, references herein to pore diameter shall be understood as referring to the equivalent cylindrical dimensions as determined by mercury porosimetry. Values obtained by mercury porosimetry as reported herein are obtained in accordance with ASTM UOP574-11, with the surface tension γ taken to be 480 mN/m and the contact angle ω taken to be 140° for mercury at room temperature. The density of mercury is taken to be 13.5462 g/cm$^3$ at room temperature.

For a sample in the form of a powder of porous particles, the total pore volume of the sample is the sum of intra-particle and inter-particle pores. This gives rise to an at least bimodal pore diameter distribution curve in a mercury porosimetry analysis, comprising a set of one or more peaks at lower pore sizes relating to the intra-particle pore diameter distribution and a set of one or more peaks at larger pore sizes relating to the inter-particle pore diameter distribution. From the pore diameter distribution curve, the lowest point between the two sets of peaks indicates the diameter at which the intra-particle and inter-particle pore volumes can be separated. The pore volume at diameters greater than this is assumed to be the pore volume associated with inter-particle pores. The total pore volume minus the inter-particle pore volume gives the intra-particle pore volume from which the intra-particle porosity can be calculated.

Porosimetry such as mercury porosimetry may also be used to measure the inter-particle porosity of the active layer of the electrode comprising the porous particles and carbon particles.

A number of high precision mercury porosimetry instruments are commercially available, such as the AutoPore IV series of automated mercury porosimeters available from Micromeritics Instrument Corporation, USA. For a complete review of mercury porosimetry reference may be made to P. A. Webb and C. Orr in "Analytical Methods in Fine Particle Technology, 1997, Micromeritics Instrument Corporation, ISBN 0-9656783-0.

It will be appreciated that mercury porosimetry and other intrusion techniques are effective only to determine the pore volume of pores that are accessible to mercury (or another fluid) from the exterior of the porous particles to be measured. As noted above, substantially all of the pore volume of the porous particles (i) is accessible from the exterior of the particles, and thus porosity measurements by mercury porosimetry will generally be equivalent to the entire pore volume of the particles. Nonetheless, for the avoidance of doubt, intra-particle porosity and electrode inter-particle porosity values as specified or reported herein shall be understood as referring to the volume of open pores, i.e. pores that are accessible to a fluid from the exterior of the particles or electrode active layer. Fully enclosed pores which cannot be identified by mercury porosimetry shall not be taken into account herein when specifying or reporting intra-particle porosity.

The porous particles (i) preferably have an intra-particle pore diameter distribution having at least one peak at a pore size less than 350 nm, more preferably less than 300 nm, more preferably less than 250 nm, and most preferably less than 200 nm, as determined by mercury porosimetry. Preferably, the pore diameter distribution has at least one peak at a pore size of more than 50 nm, more preferably more than 60 nm, and most preferably more than 80 nm, as determined by mercury porosimetry.

The porous particles (i) are therefore preferably characterised not only by the overall porosity of the porous particles, but also by the way that the porosity is distributed in the particles. Preferably, the porosity is associated with a pore diameter distribution which ensures that the architecture of the electroactive material in the porous particles (i) is neither so fine as to be degraded during processing into electrode layers nor so large as to undergo unacceptable stress during charging and discharging of the electroactive material. Thus, the porous particles (i) are sufficiently robust to survive manufacture and incorporation into an anode layer without loss of structural integrity, particularly when anode layers are calendered to produce a dense uniform layer as is conventional in the art, while also providing reversible capacity over multiple charge-discharge cycles at a level which is commercially acceptable.

The porous particles preferably comprise networks of fine structural elements having an aspect ratio of at least 2:1 and more preferably at least 5:1. A high aspect ratio of the structural elements provides a high number of interconnections between the structural elements constituting the porous particles for electrical continuity.

The thickness of the structural elements constituting the porous particles (i) is an important parameter in relation to the ability of the electroactive material to reversibly intercalate and release metal ions. Structural elements which are too thin may result in excessive first cycle loss due to excessively high BET surface area the resulting formation of an SEI layer. However, structural elements which are too thick are placed under excessive stress during insertion of metal ions and also impede the insertion of metal ions into the bulk of the silicon material. The invention aims to provide an optimum balance of these competing factors due to the presence of structural elements of optimised size and proportions. Thus, the porous particles preferably comprise structural elements having a smallest dimension less than 300 nm, preferably less than 200 nm, more preferably less than 150 nm, and a largest dimension at least twice, and preferably at least five times the smallest dimension. The smallest dimension is preferably at least 10 nm, more preferably at least 20 nm, and most preferably at least 30 nm.

The porous particles (i) may be primary or secondary particles, and are preferably discrete primary particles. However, it is not excluded that the porous silicon-containing particles may comprise porous primary particles which are incorporated into secondary particles.

For the avoidance of doubt, the term "primary particle" is used herein in its conventional meaning, i.e. to refer to the individual fragments of matter in a particulate material (IUPAC defines a "primary particle" as the "smallest discrete identifiable entity" in a particulate material). Primary particles may be distinguished from secondary particles, which are particles assembled from a plurality of primary particles and held together either by weak forces of adhesion or cohesion in the case of agglomerates, or by strong atomic or molecular forces in the case of aggregates. The primary particles forming secondary particles retain an individual identity, and it will therefore be understood that secondary particles comprising only pores between the constituent non-porous primary particles can readily be distinguished from primary particles having intrinsic porosity.

The porous particles (i) preferably have a BET surface area of less than 300 m²/g, less than 250 m²/g, less than 200 m²/g, less than 150 m²/g, less than 120 m²/g, of less than 100 m²/g, or less than 80 m²/g. Suitably, the BET surface area may be at least 10 m²/g, at least 15 m²/g, at least 20 m²/g, or at least 50 m²/g. The term "BET surface area" as used herein should be taken to refer to the surface area per unit mass calculated from a measurement of the physical adsorption of gas molecules on a solid surface, using the Brunauer-Emmett-Teller theory, in accordance with ASTM B922/10.

Control of the BET surface area of electroactive material is an important consideration in the design of electrodes for metal ion batteries. A BET surface area which is too low results in unacceptably low charging rate and capacity due to the inaccessibility of the bulk of the electroactive material to metal ions in the surrounding electrolyte. However, a very high BET surface area is also known to be disadvantageous due to the formation of a solid electrolyte interphase (SEI) layer at the anode surface during the first charge-discharge cycle of the battery. SEI layers are formed due to reaction of the electrolyte at the surface of electroactive materials and can consume significant amounts of metal ions from the electrolyte, thus depleting the capacity of the battery in subsequent charge-discharge cycles. While previous teaching in the art focuses on an optimum BET surface area below about 10 m²/g, the present inventors have found that a much wider BET range can be tolerated when using the particulate material of the invention as an electroactive material.

The electroactive material containing structural elements constituting the porous particles (i) preferably comprise amorphous or nanocrystalline electroactive material having a crystallite size of less than 100 nm, preferably less than 60 nm. The structural elements may comprise a mixture of amorphous and nanocrystalline electroactive material. The crystallite size may be determined by X-ray diffraction spectrometry analysis using an X-ray wavelength of 1.5456 nm. The crystallite size is calculated using the Scherrer equation from a 2e XRD scan, where the crystallite size $d=K\cdot\lambda/(B\cdot Cos\,\theta_B)$, the shape constant K is taken to be 0.94, the wavelength $\lambda$ is 1.5456 nm, $\theta_B$ is the Bragg angle associated with the 220 silicon peak, and B is the full width half maximum (FWHM) of that peak. Suitably the crystallite size is at least 10 nm.

The porous particles (i) may suitably be obtained by processes in which unwanted material is removed from a particulate starting material comprising the electroactive material. Removal of unwanted material may create or expose the electroactive material structures defining the porous particles. For example, this may involve the removal/reduction of oxide components from a silicon, germanium, tin and/or aluminium structure, the etching of bulk silicon, germanium, tin and/or aluminium particles, or the leaching of a metal matrix from alloy particles containing electroactive material structures in a metal matrix.

The porous particles (i) may be formed by etching electroactive material to form pores, voids or channels within the electroactive material. Example etching processes include stain etching, metal-assisted chemical etching and electrochemical etching. The porous particle (ii) may be formed by reduction of the oxides of electroactive material to form porous electroactive material. For example, porous silicon particles may be formed by the magnesiothermic reduction of silica or silicon monoxide.

The porous particles (i) may be formed from a particulate or bulk starting material and the process may comprise fragmentation, fracturing or milling of the porosified starting material to form the porous particles (i).

The porous particles (i) are preferably obtained by a process comprising leaching particles of an alloy comprising silicon and/or germanium structures in a metal matrix. This process relies on the observation that a network of crystalline silicon and/or germanium structures is precipitated within an alloy matrix when certain alloys containing these elements are cooled from the molten state.

Suitably, the alloys comprise matrix metals in which the solubility of silicon and/or germanium is low and/or in which the formation of intermetallics on cooling is negligible or non-existent. Leaching of the metals constituting the metal matrix exposes the network of silicon and/or germanium structures. Thus, leaching particles of an alloy comprising silicon and/or germanium provides a suitable route to the porous particles defined above.

The porous particles (i) may comprise a plurality of electroactive material-containing fragments which are agglomerated or otherwise assembled or connected together to form the porous particles (i).

The carbon particles (ii) are preferably graphite particles. The graphite particles may comprise synthetic or natural graphite. Preferably, the graphite has a maximum specific capacity of at least 300 mAh/g, for example from 300 to 360 mAh/g or from 300 to 340 mAh/g.

The carbon particles (ii) have a $D_{50}$ particle diameter in the range of from 1 to 50 μm. Preferably the $D_{50}$ particle diameter of the carbon particles (ii) is at least 2 μm, at least 5 μm, at least 7 μm, at least 8 μm, at least 10 μm, at least 12 μm, or at least 15 μm. Preferably, the $D_{50}$ particle diameter of the carbon particles (ii) is no more than 45 μm, no more than 40 μm, no more than 35 μm, no more than 30 μm, or no more than 25 μm. Where the $D_{50}$ particle sizes of the porous particles (i) and the carbon particles (ii) are within the preferred ranges disclosed herein, the porous particles (i) are advantageously able to occupy void space between the carbon particles (ii), particularly when one or preferably both of the porous particles (i) and carbon particles (ii) are spheroidal in shape.

The carbon particles (ii) may thus be in the form of spheroidal particles having an average sphericity $S_{av}$ of at least 0.70, preferably at least 0.85, more preferably at least 0.90, more preferably at least 0.92, more preferably at least 0.93, more preferably at least 0.94, and most preferably at least 0.95.

The carbon particles (ii) may have an average aspect ratio of less than 3:1, preferably no more than 2.5:1, more preferably no more than 2:1, more preferably no more than 1.8:1, more preferably no more than 1.6:1, more preferably no more than 1.4:1 and most preferably no more than 1.2:1.

In preferred embodiments, the carbon particles (ii) are selected from spheroidal graphite particles having a $D_{50}$ particle diameter in the range of from 5 to 50 μm. More preferably, the carbon particles (ii) are selected from spheroidal graphite particles having a $D_{50}$ particle diameter in the range of from 8 to 25 μm. Most preferably, the carbon particles (ii) are selected from spheroidal graphite particles having a $D_{50}$ particle diameter in the range of from 8 to 25 μm and the porous particles (i) are selected from porous spheroidal particles comprising silicon, as described above.

The active layer of the electrode preferably comprises from 60 to 95 wt %, preferably from 70 to 95 wt %, and most preferably from 80 to 95 wt % of the carbon particles (ii).

The active layer of the electrode suitably comprises from 1 to 30 wt % of the porous particles (i). Preferably, the active layer comprises at least 2 wt %, more preferably at least 5 wt % and most preferably at least 8 wt % of the porous particles (i). Preferably the active layer comprises no more than 25 wt %, more preferably no more than 20 wt %, and most preferably no more than 15 wt % of the porous particles (i).

The ratio of the $D_{50}$ particle diameter of the carbon particles (ii) to the $D_{50}$ particle diameter of the porous particles (i) is preferably at least 2, at least 2.5, at least 3, at least 3.5, or at least 4. The ratio of the $D_{50}$ particle diameter of the carbon particles (ii) to the $D_{50}$ particle diameter of the porous particles (i) is preferably no more than 25, no more than 20, no more than 15, or no more than 10.

The active layer suitably has an inter-particle porosity of no more than 30%, preferably no more than 25%, and most preferably no more than 20%. Preferably, the inter-particle porosity of the active layer is at least 2%, more preferably at least 5%, and most preferably at least 10%. The inter-particle porosity of the active layer is suitably determined by mercury porosimetry as described above. It is found that the combination of the porous particles (i) and the carbon particles (ii) together with inter-particle porosity in the ranges set out herein facilitates homogeneous wetting of the active materials by an electrolyte without an excessive reduction in the volumetric energy density of the active layer. Accordingly, the charge and discharge rates of the active layer are maintained at acceptable levels and irreversible loss of metal ions is reduced.

The active layer of the electrode in a dry, uncharged state, preferably has a density in the range of from 1 to 2 g/cm³. Preferably, the active layer of the electrode has a density in the range of from 1.05 g/cm³ to 1.95 g/cm³, from 1.1 g/cm³ to 1.9 g/cm³, or from 1.15 g/cm³ to 1.9 g/cm³. Optionally, the active layer of the electrode has a density of at least 1.2 g/cm³, at least 1.25 g/cm³, at least 1.3 g/cm³, at least 1.35 g/cm³, or at least 1.4 g/cm³. Optionally, the active layer of the electrode has a density of no more than 1.85 g/cm³, no more than 1.8 g/cm³, or no more than 1.75 g/cm³. For instance, the active layer of the electrode may have a density from 1.05 g/cm³ to 1.1 g/cm³, from 1.1 g/cm³ to 1.15 g/cm³, from 1.15 g/cm³ to 1.2 g/cm³, from 1.2 g/cm³ to 1.25 g/cm³, from 1.25 g/cm³ to 1.3 g/cm³, from 1.3 g/cm³ to 1.35 g/cm³, from 1.35 g/cm³ to 1.4 g/cm³, from 1.4 g/cm³ to 1.45 g/cm³, from 1.45 g/cm³ to 1.5 g/cm³, from 1.5 g/cm³ to 1.55 g/cm³, from 1.55 g/cm³ to 1.6 g/cm³, from 1.6 g/cm³ to 1.65 g/cm³, from 1.65 g/cm³ to 1.7 g/cm³, from 1.7 g/cm³ to 1.75 g/cm³, from 1.75 g/cm³ to 1.8 g/cm³, from 1.8 g/cm³ to 1.85 g/cm³, from 1.85 g/cm³ to 1.9 g/cm³, or from 1.9 g/cm³ to 1.95 g/cm³.

The density of the active layer may suitably be measured by measuring the mass and thickness of an electrode of known dimensions before and after removal of the active layer from the electrode current collector.

It will be understood that a high density active layer would be expected in theory to provide a high energy density. However, if the density of the active layer is too high, then the active layer does not have sufficient porosity to allow the electrolyte to permeate through the active layer, which results in uneven lithiation of the active layer leading to cracking of the active layer and high ionic resistance. With solid silicon particles, high density electrode layers can be obtained, but repeated metallation and demetallation of the silicon leads to increased expansion of the electrode layer and electrical disconnection of particles. Significant electrode expansion may also place a strain on other electrode components.

Conventional graphite only electrodes have a typical coating density in the range of from 1.8 to 2.3 g/cm³. However, the present inventors have identified that for the electrodes of the invention, optimum performance is obtained at an active layer density which is somewhat lower, whilst still achieving higher volumetric energy densities at full charge than conventional electrodes. The reduced density of the active layer compared to graphite electrodes is compensated by the significantly higher volumetric capacity of materials such as silicon. Accordingly, electrodes having active layers having density within the preferred ranges identified above are found to provide an optimum balance between volumetric energy density, electrical connectivity and low electrode expansion, whilst still maintaining good penetration of the electrolyte into the active layer.

Suitably, the electrode of the invention has an active layer with a volumetric energy density at first full charge of at least 450 mAh/cm³, suitably at least 575 mAh/cm³, suitably at least 600 mAh/cm³, suitably at least 650 mAh/cm³.

The electrode of the invention may also be characterised by cutting a cross-section through the active layer and carrying out image analysis of the active layer cross-section using SEM imaging. An electrode sample is sectioned by cutting in a direction transverse to the planar surface of the active layer and then imaged in an SEM to provide cross-sectional images of the components and void spaces within the active layer. Digital image analysis software such as the open source ImageJ software may be used to identify and distinguish between the porous particle areal sections and carbon particle areal sections and to compute the Feret diameters and sphericity of each particle. The total area of voids and pore spaces within the cross-section may also be calculated. Suitably at least two or more cross sections of the electrode should be made, parallel to each other and equally spaced apart. Suitably at least 3, preferably at least 5, and more preferably at least 10 cross sections are measured. The spacing between each cross section is suitably at least 20 µm. The average Feret diameters and average sphericity values are calculated as an average of the value for all particles being measured across the plurality of cross-sections.

For example, the electrode of the invention may be characterised by reference to the average maximum Feret diameter of the porous particles (i) observable in the active layer cross section (referred to herein as $F_{max}PP$). Suitably, $F_{max}PP$ is in the range of from 0.5 to 18 µm. Optionally, $F_{max}PP$ may be at least 0.8 µm, at least 1 µm, at least 1.5 µm, at least 2 µm, at least 2.5 µm, or at least 3 µm. Optionally, $F_{max}PP$ may be no more than 15 µm, no more than 12 µm, no more than 10 µm, no more than 8 µm, no more than 7 µm, no more than 6.5 µm, no more than 6 µm, no more than 5.5 µm, no more than 5 µm, no more than 4.5 µm, no more than 4 µm, or no more than 3.5 µm.

The electrode of the invention may be characterised by reference to the average minimum Feret diameter of the porous particles (i) observable in the active layer cross (referred to herein as $F_{min}PP$). Suitably, $F_{min}PP$ may be at least 0.1 µm, at least 0.2 µm, at least 0.3 µm, at least 0.4 µm, at least 0.5 µm, at least 0.6 µm, at least 0.8 µm or at least 1 µm. Optionally, $F_{min}PP$ is no more than 15 µm, no more than 12 µm, no more than 10 µm, no more than 8 µm, no more than 6 µm, no more than 5 µm, no more than 4.5 µm, no more than 4 µm, no more than 3.5 µm, no more than 3 µm, or no more than 2.5 µm. Optionally, the value of $F_{min}PP$ may be at least 50% of the value of $F_{max}PP$, for example at least 60%, at least 70%, at least 80%, at least 90% or at least 95% of the value of $F_{max}PP$.

For the avoidance of doubt, the term "maximum Feret diameter" as used herein refers to the maximum distance between a pair of parallel lines tangent to the two-dimensional projection of a particle. The term "average maximum Feret diameter" or "$F_{max}$" as used herein refers to the mean number average maximum Feret diameter. Likewise, the term "minimum Feret" diameter as used herein refers to the minimum distance between a pair of parallel lines tangent to the two-dimensional projection of a particle. The term "average minimum Feret diameter" or "$F_{min}$" as used herein refers to the mean number average minimum Feret diameter as calculated from a minimum of 3, preferably 5 and most preferably 10 electrode active layer cross-sections.

The average maximum Feret diameter of the carbon particles (ii) observable in the active layer cross section (referred to herein as $F_{max}C$) is suitably in the range of from 1 to 50 µm. Preferably $F_{max}C$ is at least 2 µm, at least 5 µm, at least 7 µm, at least 8 µm, at least 10 µm, at least 12 µm, or at least 15 µm. Preferably, $F_{max}C$ is no more than 45 µm, no more than 40 µm, no more than 35 µm, no more than 30 µm, or no more than 25 µm.

The average minimum Feret diameter of the carbon particles (ii) observable in the active layer cross section (referred to herein as $F_{min}C$) is suitably at least 0.5 µm, at least 1 µm, at least 2 µm, at least 5 µm, at least 8 µm, at least 10 µm, at least 12 µm, or at least 15 µm. Optionally, $F_{min}C$ is no more than 40 µm, no more than 35 µm, no more than 30 µm, or no more than 20 µm. Optionally, the value of $F_{min}C$ may be at least 50% of the value of $F_{max}C$, for example at least 60%, at least 70%, at least 80%, at least 90% or at least 95% of the value of $F_{max}C$.

The active layer of the electrode of the invention may also be defined by reference to the average percentage of the cross sectional area of the active layer that is occupied by the porous particles (i) including their intra-particle pores, the carbon particles (ii) and the inter-particle pores as a percentage of the total area occupied by the active layer in the cross section. Suitably, the average percent cross-sectional area of the active layer occupied by the porous particles (i) including intra-particle pores, the carbon particles (ii) and the inter-particle pores may be measured by SEM imaging and is reported herein as a mean average of at least three cross-sections of the active layer having a cross-sectional area defined by the thickness of the active layer and a transverse width of at least 100 µm.

The percent average cross-sectional area of the active layer occupied by the porous particles (i) including their intra-particle pores is preferably in the range of from 1% to 25%, more preferably from 2% to 20%, more preferably from 5% to 20% and most preferably from 5% to 15%.

The percent average cross-sectional area of the active layer occupied by the carbon particles (ii) is preferably in the range of from 40% to 85%, more preferably from 45% to 85%, more preferably from 45% to 80% and most preferably from 45% to 75%.

The percent average cross-sectional area of the active layer occupied by the inter-particle pores of the active layer is preferably in the range of from 2% to 30%, more preferably from 2% to 25%, more preferably from 5% to 25%, more preferably from 10 to 25% and most preferably from 10 to 20%.

The active layer may optionally comprise a binder. A binder functions to adhere the components of the active layer to a current collector and to maintain the integrity of the active layer. Examples of binders which may be used in accordance with the present invention include polyvinylidene fluoride (PVDF), polyacrylic acid (PAA) and alkali metal salts thereof, modified polyacrylic acid (mPAA) and alkali metal salts thereof, carboxymethylcellulose (CMC), modified carboxymethylcellulose (mCMC), sodium carboxymethylcellulose (Na-CMC), polyvinylalcohol (PVA), alginates and alkali metal salts thereof, styrene-butadiene rubber (SBR) and polyimide. The active layer may comprise a mixture of binders. Preferably, the binder comprises polymers selected from polyacrylic acid (PAA) and alkali metal salts thereof, and modified polyacrylic acid (mPAA) and alkali metal salts thereof, SBR and CMC.

The binder may suitably be present in an amount of from 0.5 to 20 wt %, preferably 1 to 15 wt % and most preferably 2 to 10 wt %, based on the total weight of the active layer.

The binder may optionally be present in combination with one or more additives that modify the properties of the binder, such as cross-linking accelerators, coupling agents and/or adhesive accelerators.

The active layer may optionally comprise one or more conductive additives. Preferred conductive additives are non-electroactive materials which are included so as to improve electrical conductivity between the electroactive components of the active layer and between the electroactive components of the active layer and the current collector. The conductive additives may suitably be selected from carbon black, carbon fibres, carbon nanotubes, acetylene black, ketjen black, graphene, nanographene platelets, metal fibres, metal powders and conductive metal oxides. Preferred conductive additives include carbon black, carbon fibres and carbon nanotubes.

The one or more conductive additives may suitably be present in a total amount of from 0.5 to 20 wt %, preferably 1 to 15 wt % and most preferably 2 to 10 wt %, based on the total weight of the active layer.

The active layer suitably has a thickness in the range of from 15 µm to 2 mm, preferably 15 µm to 1 mm, preferably 15 µm to 500 µm, preferably 15 µm to 200 µm, preferably 20 µm to 100 µm, preferably 20 µm to 60 µm.

As used herein, the term current collector refers to any conductive substrate which is capable of carrying a current to and from the electroactive particles in the electrode composition. Examples of materials that can be used as the current collector include copper, aluminium, stainless steel, nickel, titanium and sintered carbon or alloys or mixtures thereof. Copper is a preferred material. Preferably the surface of the current collector is treated to increase adhesion of the active layer, for example by a treatment to roughen the surface of the current collector. The current collector is typically in the form of a foil or mesh having a thickness of between 3 to 100 µm. The current collector may be coated on one or both sides with an active layer of the invention.

In a second aspect, the present invention provides an electrode composition comprising:
  (i) a plurality of porous particles comprising an electroactive material selected from silicon, germanium, tin and mixtures thereof, wherein the porous particles have a $D_{50}$ particle diameter in the range of 0.5 to 18 µm, and an intra-particle porosity in the range of from 30 to 90%,
  (ii) a plurality of carbon particles selected from graphite, soft carbon and hard carbon and having a $D_{50}$ particle diameter in the range of from 1 to 50 µm; and
wherein the electrode composition comprises at least 50% by weight of the carbon particles (ii), based on the solids content of the electrode composition, and wherein the ratio of the $D_{50}$ particle diameter of the carbon particles (ii) to the $D_{50}$ particle diameter of the porous particles (i) is in the range of from 1.5 to 30.

The porous particles (i) and the carbon particles (ii) of the electrode composition of the second aspect of the invention may have any of the features described as preferred or optional with reference to the first aspect of the invention.

The electrode composition preferably comprises from 60 to 95 wt %, preferably from 70 to 95 wt %, and most preferably from 80 to 95 wt % of the carbon particles (ii), based on the solids content of the electrode composition.

The electrode composition preferably comprises from 1 to 30 wt % of the porous particles (i), based on the solids content of the electrode composition. Preferably, the electrode composition comprises at least 2 wt %, more preferably at least 5 wt % and most preferably at least 8 wt % of the porous particles (i), based on the solids content of the electrode composition. Preferably the active layer comprises no more than 25 wt % and most preferably no more than 20 wt %, for example no more than 15 wt % of the porous particles (i), based on the solids content of the electrode composition.

The ratio of the $D_{50}$ particle diameter of the carbon particles (ii) to the $D_{50}$ particle diameter of the porous particles (i) is preferably at least 2, at least 2.5, at least 3, at least 3.5, or at least 4. The ratio of the $D_{50}$ particle diameter of the carbon particles (ii) to the $D_{50}$ particle diameter of the porous particles (i) is preferably no more than 25, no more than 20, no more than 15, or no more than 10.

The electrode composition may optionally comprise a binder or binder precursor. Examples of binders which may be used in accordance with the present invention include polyvinylidene fluoride (PVDF), polyacrylic acid (PAA) and alkali metal salts thereof, modified polyacrylic acid (mPAA) and alkali metal salts thereof, carboxymethylcellulose (CMC), modified carboxymethylcellulose (mCMC), sodium carboxymethylcellulose (Na-CMC), polyvinylalcohol (PVA), alginates and alkali metal salts thereof, styrene-butadiene rubber (SBR) and polyimide. The electrode composition may comprise a mixture of binders. Preferably, the binder comprises polymers selected from polyacrylic acid (PAA) and alkali metal salts thereof, and modified polyacrylic acid (mPAA) and alkali metal salts thereof, SBR and CMC.

The binder may suitably be present in an amount of from 0.5 to 20 wt %, preferably 1 to 15 wt % and most preferably 2 to 10 wt %, based on the solids content of the electrode composition.

The binder may optionally be present in combination with one or more additives that modify the properties of the binder, such as cross-linking accelerators, coupling agents and/or adhesive accelerators.

The electrode composition may optionally comprise one or more conductive additives. Preferred conductive additives are non-electroactive materials which are included so as to improve electrical conductivity between the electroactive components of the active layer and between the electroactive components of the active layer and a current collector. The conductive additives may suitably be selected from carbon black, carbon fibres, carbon nanotubes, acetylene black, ketjen black, graphene, nanographene platelets, metal fibres, metal powders and conductive metal oxides. Preferred conductive additives include carbon black and carbon nanotubes.

The one or more conductive additives may suitably be present in a total amount of from 0.5 to 20 wt %, preferably 1 to 15 wt % and most preferably 2 to 10 wt %, based on the solids content of the electrode composition.

The electrode composition may optionally comprise a solvent. Thus, the electrode composition may optionally be in the form of a slurry or a suspension. The solvent may be water or an organic solvent. Examples of suitable organic solvents include N-methylpyrrolidone, N,N-dimethylformamide, N,N-diethylformamide, dimethylsulfoxide, tetrahydrofuran, and $C_1$-$C_4$ alcohols. As noted above, the solvent is not taken into account when specifying the weight percentages of the solid components of the electrode composition.

In a third aspect, the present invention provides a method of preparing an electrode, the method comprising:
 (i) preparing a slurry comprising an electrode composition as defined with reference to the second aspect of the invention and including a solvent;
 (ii) casting the slurry onto the surface of a current collector; and
 (iii) removing the solvent to form an active layer in electrical contact with the current collector.

The electrode composition and current collector used in the method of the third aspect of the invention may have any of the features described as preferred or optional with regard to the first and/or second aspect of the invention.

Preferably, the electrode composition comprises a binder as defined above.

Preferably, the electrode composition comprises at least one conductive additive, as defined above. The method of the third aspect of the invention may optionally comprise further processing steps, such as heat treatment, for example to cure or heat-set any binder that may be present in the active layer, and/or applying pressure to the active layer (e.g. using a press or roller) to densify it.

In a fourth aspect, the present invention provides a method of preparing an electrode, the method comprising:
 (i) preparing a slurry comprising an electrode composition as defined with reference to the second aspect of the invention and including a solvent;
 (ii) casting the slurry onto a template;
 (iii) removing the solvent to form a freestanding film or mat comprising the electrode composition; and
 (iv) attaching the freestanding film or mat from step (iii) to a current collector to form an active layer in electrical contact with the current collector.

The electrode composition and current collector used in the method of the fourth aspect of the invention may have any of the features described as preferred or optional with regard to the first and/or second aspect of the invention.

Preferably, the electrode composition comprises a binder as defined above.

Preferably, the electrode composition comprises at least one conductive additive, as defined above.

The method of the fourth aspect of the invention may optionally comprise further processing steps, such as heat treatment, for example to cure or heat-set any binder that may be present in the active layer, and/or applying pressure to the active layer (e.g. using a press or roller) to densify it. Such steps may be carried out during formation of the freestanding film or mat comprising the electrode composition in step (iii), and/or following attachment of the freestanding film or mat comprising the electrode composition to the current collector in step (iv).

Preferably, the methods of the third and fourth aspects of the invention comprise the step of densifying the active layer from step (iii) to obtain an active layer density in the range of from 1 to 2 g/cm$^3$. In accordance with the fourth aspect of the invention, the densifying step may be performed before or after step (iv).

Preferably, the active layer density obtained in the densifying step is in the range of from 1.05 g/cm$^3$ to 1.95 g/cm$^3$ or from 1.1 g/cm$^3$ to 1.9 g/cm$^3$, or from 1.15 g/cm$^3$ to 1.85 g/cm$^3$. For instance, the active layer density obtained in the densifying step may be from 1.05 g/cm$^3$ to 1.1 g/cm$^3$, from 1.1 g/cm$^3$ to 1.15 g/cm$^3$, from 1.15 g/cm$^3$ to 1.2 g/cm$^3$, from 1.2 g/cm$^3$ to 1.25 g/cm$^3$, from 1.25 g/cm$^3$ to 1.3 g/cm$^3$, from 1.3 g/cm³ to 1.35 g/cm³, from 1.35 g/cm³ to 1.4 g/cm³, from 1.4 g/cm³ to 1.45 g/cm³, from 1.45 g/cm³ to 1.5 g/cm³, from 1.5 g/cm³ to 1.55 g/cm³, from 1.55 g/cm³ to 1.6 g/cm³, from 1.6 g/cm³ to 1.65 g/cm³, from 1.65 g/cm³ to 1.7 g/cm³, from 1.7 g/cm³ to 1.75 g/cm³, from 1.75 g/cm³ to 1.8 g/cm³, from 1.8 g/cm³ to 1.85 g/cm³, from 1.85 g/cm³ to 1.9 g/cm³, or from 1.9 g/cm³ to 1.95 g/cm³.

The electrode of the first aspect of the invention may be used as the anode of a metal-ion battery. Thus, in a fifth aspect, the present invention provides a rechargeable metal-ion battery comprising: (i) an anode, wherein the anode comprises an electrode as described with reference to the first aspect of the invention; (ii) a cathode comprising a cathode active material capable of releasing and reabsorbing metal ions; and (iii) an electrolyte between the anode and the cathode.

The metal ions are preferably selected from lithium, sodium, potassium, calcium or magnesium. More preferably the rechargeable metal-ion battery of the invention is a lithium-ion battery, and the cathode active material is capable of releasing and lithium ions.

The cathode active material is preferably a metal oxide-based composite. Examples of suitable cathode active materials include $LiCoO_2$, $LiCo_{0.99}Al_{0.01}O_2$, $LiNiO_2$, $LiMnO_2$, $LiCo_{0.5}Ni_{0.5}O_2$, $LiCo_{0.7}Ni_{0.3}O_2$, $LiCo_{0.8}Ni_{0.2}O_2$, $LiCo_{0.82}Ni_{0.18}O_2$, $LiC_{0.8}Ni_{0.15}Al_{0.05}O_2$, $LiNi_{0.4}Co_{0.3}Mn_{0.3}O_2$ and $LiNi_{0.33}Co_{0.33}Mn_{0.34}O_2$. The cathode current collector is generally of a thickness of between 3 to 500 μm. Examples of materials that can be used as the cathode current collector include aluminium, stainless steel, nickel, titanium and sintered carbon.

The electrolyte is suitably a non-aqueous electrolyte containing a metal salt, e.g. a lithium salt, and may include, without limitation, non-aqueous electrolytic solutions, solid electrolytes and inorganic solid electrolytes. Examples of non-aqueous electrolyte solutions that can be used include non-protic organic solvents such as propylene carbonate, ethylene carbonate, butylene carbonates, dimethyl carbonate, diethyl carbonate, gamma butyrolactone, 1,2-dimethoxyethane, 2-methyltetrahydrofuran, dimethylsulfoxide, 1,3-dioxolane, formamide, dimethylformamide, acetonitrile, nitromethane, methylformate, methyl acetate, phosphoric acid triesters, trimethoxymethane, sulfolane, methyl sulfolane and 1,3-dimethyl-2-imidazolidinone.

Examples of organic solid electrolytes include polyethylene derivatives polyethyleneoxide derivatives, polypropylene oxide derivatives, phosphoric acid ester polymers, polyester sulfide, polyvinylalcohols, polyvinylidine fluoride and polymers containing ionic dissociation groups.

Examples of inorganic solid electrolytes include nitrides, halides and sulfides of lithium salts such as $Li_5NI_2$, $Li_3N$, LiI, $LiSiO_4$, $Li_2SiS_3$, $Li_4SiO_4$, LiOH and $Li_3PO_4$.

The lithium salt is suitably soluble in the chosen solvent or mixture of solvents. Examples of suitable lithium salts include LiCl, LiBr, LiI, $LiClO_4$, $LiBF_4$, $LiBC_4O_8$, $LiPF_6$, $LiCF_3SO_3$, $LiAsF_6$, $LiSbF_6$, $LiAlCl_4$, $CH_3SO_3Li$ and $CF_3SO_3Li$.

Where the electrolyte is a non-aqueous organic solution, the battery is preferably provided with a separator interposed between the anode and the cathode. The separator is typically formed of an insulating material having high ion permeability and high mechanical strength. The separator typically has a pore diameter of between 0.01 and 100 μm and a thickness of between 5 and 300 μm. Examples of suitable electrode separators include a micro-porous polyethylene film.

The separator may be replaced by a polymer electrolyte material and in such cases the polymer electrolyte material is present within both the composite anode layer and the composite cathode layer. The polymer electrolyte material can be a solid polymer electrolyte or a gel-type polymer electrolyte.

In a sixth aspect, the invention provides the use of an electrode composition as defined with reference to the second aspect of the invention as an anode active material.

Example Method for Preparation of Porous Particles

Where the porous particles (i) comprise silicon or germanium, they may suitably be prepared by leaching of a metal matrix from alloy particles containing electroactive material structures in a metal matrix. Preferably, the porous particles may be prepared by a method comprising the steps of:

(a) providing a plurality of alloy particles, wherein the alloy particles are obtained by cooling a molten alloy comprising: (i) from 11 to 30 wt % of an electroactive material component selected from silicon, germanium and mixtures thereof; and (ii) a matrix metal component, wherein said alloy particles have a $D_{50}$ particle diameter in the range of 1 to 7 μm, and wherein said alloy particles comprise discrete electroactive material containing structures dispersed in the matrix metal component;

(b) leaching the alloy particles from step (a) to remove at least a portion of the matrix metal component and to at least partially expose the electroactive material containing structures;

wherein the porous particles comprise no more than 40% by weight of the matrix metal component.

This process relies on the observation that crystalline electroactive material containing structures are precipitated within a matrix metal component when certain alloys are cooled. These alloys are those in which the solubility of the electroactive materials in the material metal is low and in which there is little or no formation of intermetallics on cooling. By controlling the concentration of the electroactive material in the alloy in the range specified above, it is found that a particulate material is obtained having porosity and other structural properties that are particularly suitable for use in hybrid anodes for lithium ion batteries.

The alloy particles preferably have particle dimensions corresponding to the dimensions of the porous particles (i) as disclosed herein. Thus, the alloy particles suitably have a $D_{50}$ particle diameter in the range of from 0.5 μm to 18 μm and preferred $D_{10}$, $D_{50}$, $D_{90}$ and $D_{99}$ particle diameters as disclosed above for the porous particles (i).

The alloy particles are preferably spheroidal particles. Thus, the alloy particles preferably have an average sphericity of at least 0.70, more preferably at least 0.85, more preferably at least 0.90, more preferably at least 0.92, more preferably at least 0.93, more preferably at least 0.94, more preferably at least 0.95, more preferably at least 0.96, more preferably at least 0.97, more preferably at least 0.98, and most preferably at least 0.99.

The average aspect ratio of the alloy particles is preferably less than 3:1, more preferably no more than 2.5:1, more preferably no more than 2:1, more preferably no more than 1.8:1, more preferably no more than 1.6:1, more preferably no more than 1.4:1 and most preferably no more than 1.2:1.

A preferred component of the electroactive material is silicon. Thus, the electroactive material component of the alloy particles preferably comprises at least 90 wt %, more preferably at least 95 wt %, more preferably at least 98 wt %, more preferably at least 99 wt % silicon.

The alloy particles preferably comprise at least 11.2 wt %, more preferably at least 11.5 wt %, more preferably at least 11.8 wt %, more preferably at least 12 wt %, and most preferably at least 12.2 wt % of the electroactive material component. For example, the alloy particles may comprise at least 12.2 wt %, at least 12.4 wt %, at least 12.6 wt %, at least 12.8 wt %, or at least 13 wt % of the electroactive material component. Preferably, the alloy particles comprise less than 27 wt %, preferably less than 24 wt %, and most preferably less than 18 wt % of the electroactive material component. The amount of electroactive material in the alloy particles is of course dictated by the desired structure of the porous particles, including the desired porosity and pore size of the porous particles, and the dimensions of the structural elements.

The matrix metal component is suitably selected from Al, Sb, Cu, Mg, Zn, Mn, Cr, Co, Mo, Ni, Be, Zr, Fe, Sn, Ru, Ag, Au and combinations thereof. Preferably, the matrix metal component comprises one or more of Al, Ni, Ag or Cu. More preferably, the matrix metal component comprises at least 50 wt %, more preferably at least 60 wt %, more preferably at least 70 wt %, more preferably at least 80 wt %, more preferably at least 90 wt % and most preferably at least 95 wt % of one or more of Al, Ni, Ag or Cu.

A preferred matrix metal component is aluminium. Thus, the matrix metal component may be aluminium, or a combination of aluminium with one or more additional metals or rare earths, for example one or more of Sb, Cu, Mg, Zn, Mn, Cr, Co, Mo, Ni, Be, Zr, Fe, Na, Sr, P, Sn, Ru, Ag and Au, wherein the combination comprises at least 50 wt %, more preferably at least 60 wt %, more preferably at least 70 wt %, more preferably at least 80 wt %, more preferably at least 90 wt %, more preferably at least 95 wt % aluminium. More preferably, the matrix metal component is selected from aluminium or a combination of aluminium with copper and/or silver and/or nickel, wherein the combination comprises at least 50 wt %, more preferably at least 60 wt %, more preferably at least 70 wt %, more preferably at least 80 wt %, more preferably at least 90 wt % and most preferably at least 95 wt % of aluminium.

Preferably, the electroactive material is silicon or a combination of silicon and germanium, wherein the combination comprises at least 90 wt %, more preferably at least 95 wt %, more preferably at least 98 wt %, more preferably at least 99 wt % silicon, and the matrix metal component is aluminium, or a combination of aluminium with one or more of Sb, Cu, Mg, Zn, Mn, Cr, Co, Mo, Ni, Be, Zr, Fe, Na, Sr, P, Sn, Ru, Ag and Au, wherein the combination comprises at least 90 wt %, more preferably at least 95 wt % aluminium.

Most preferably, the electroactive material is silicon and the matrix metal component is aluminium. Silicon-aluminium alloys are well-known in the field of metallurgy and have a range of useful properties, including excellent wear-resistance, cast-ability, weld-ability and low shrinkage. They are widely used in industry wherever these properties are desired, for instance as car engine blocks and cylinder heads.

It will be appreciated that metallurgical-grade aluminium and silicon may comprise minor amounts of other elements as impurities, including those identified herein as optional components of the alloy particles. For the avoidance of doubt, where it is stated herein that the electroactive material is silicon and the matrix metal component is aluminium, it is not excluded that the alloy particles may comprise minor amounts of other elements, provided that the total amount of such additional elements is less than 5 wt %, more preferably 2 wt %, and most preferably less than 1 wt %. Amounts of electroactive materials as specified herein shall not be interpreted as including impurities.

Silicon has negligible solubility in solid aluminium and does not form intermetallics with aluminium. Thus, aluminium-silicon alloy particles comprise discrete silicon structures dispersed in an aluminium matrix. By maintaining the concentration of silicon in the alloy particles in the ranges set out herein, it is found that the porous particles obtained after leaching have a specific microstructure which is particularly advantageous for use in hybrid electrodes for metal ion batteries.

The eutectic point of a silicon-aluminium alloy is at a concentration of ca. 12.6 wt % silicon. In the case of a silicon-aluminium alloy it has been found that the presence of silicon in an amount significantly above the eutectic composition may lead to the formation of larger silicon elements within the alloy particles. For instance, where the amount of silicon in the alloy particles is in the range of 20 to 30 wt %, and particularly in the range of 24 to 30 wt %, coarse primary phase silicon domains may be observed following leaching of the matrix metal component. The size of such primary phase structures is dependent on the cooling rate during solidification of the alloy and can also be modified by adding further known additives to the alloy. However, provided that the total amount of silicon in the alloy particles does not exceed 30 wt %, more preferably 24 wt %, it is considered that the overall microstructure of the porous particles will be sufficiently fine to provide acceptable capacity retention during charging and discharging of hybrid electrodes comprising the porous particles The shape and distribution of the discrete electroactive material structures within the alloy particles is a function of both the composition of the alloy particles and the process by which the alloy particles are made. If the amount of electroactive material is too low, then it is found that the porous particles obtained after removal of the matrix metal component have poor structural integrity, and tend to disintegrate during manufacture and/or subsequent incorporation into anodes. In addition, the capacity retention of such particles may be inadequate for commercial applications due to insufficient resilience to the volumetric changes on charging and discharging.

The size and shape of the electroactive material structures may be influenced by controlling the rate of cooling of the alloy from the melt and the presence of modifiers (chemical additives to the melt). In general, faster cooling will lead to the formation of smaller, more evenly distributed silicon structures. The rate of cooling, and thus the size and shape of the electroactive material structures formed, is a function of the process used to form the alloy particles. Thus, by the selection of an appropriate process for the formation of the alloy particles, alloy particles may be obtained in which the dispersed electroactive material structures have a morphology which, when exposed by leaching of the matrix metal, is particularly desirable for use in metal-ion batteries, in particular metal-ion batteries having hybrid electrodes.

The alloy particles are preferably obtained by cooling a molten alloy from the liquid state to the solid state at a cooling rate of at least $1 \times 10^3$ K/s, preferably at least $5 \times 10^3$ K/s, preferably at least $1 \times 10^4$ K/s, more preferably at least $5 \times 10^4$ K/s, for example at least $1 \times 10^5$ K/s, or at least $5 \times 10^5$ K/s, or at least $1 \times 10^6$ K/s, or at least $5 \times 10^6$ K/s, or at least $1 \times 10^7$ K/s. It is found that the pore diameter distribution of the porous particles increases towards larger pore sizes with increased cooling rates.

Processes for cooling a molten alloy to form alloy particles with a cooling rate of at least $10^3$ K/s include gas atomisation, water atomisation, melt-spinning, splat cooling and plasma phase atomisation. Preferred processes for cooling the molten alloy to form alloy particles include gas atomisation and water atomisation. It is found that the rate of cooling of the particles obtained by gas and water atomisation processes may be correlated to the size of the alloy particles, and alloy particles having a particle size as specified herein cool at very high rates (i.e. in excess of $1\times10^3$ K/s, and typically at least $1\times10^5$ K/s) and thus the electroactive material structures formed in the alloy particles have a morphology which is particularly preferred. If necessary, the alloy particles obtained by any particular cooling method may be classified to obtain an appropriate size distribution.

The metal matrix may be leached using any leachant which is suitable to remove at least a portion of the matrix metal component while leaving the electroactive material structures intact. Leachants may be liquid or gas phase and may include additives or sub-processes to remove any by-product build up which might impede leaching. Leaching may suitably be carried out by a chemical or electrochemical process. Caustic leaching using sodium hydroxide may be used for leaching aluminium, although the concentration of sodium hydroxide in the leachant solution should be controlled below 10 to 20 wt % to avoid attack of silicon and/or germanium by the leachant. Acidic leaching, for instance using hydrochloric acid or ferric chloride, is also a suitable technique. Alternatively, the matrix metal may be leached electrochemically using salt electrolytes, e.g. copper sulfate or sodium chloride. Leaching is carried out until the desired porosity of the porous particles is achieved. For example, acid leaching using 6M aqueous HCl at room temperature for a period of from 10 to 60 minutes is sufficient to leach substantially all of the leachable aluminium from the silicon-aluminium alloys described herein (noting that a minor amount of the matrix metal may not be leached).

Following leaching of the matrix metal component, the porous particles will be formed intact in the leachant. In general, it is appropriate to carry out cleaning and rinsing steps so as to remove by-products and residual leachant. The fine distribution of the silicon structural elements in the alloy particles is such that the porous particles obtained after leaching have particle dimensions and shape which are substantially equal to the particle dimensions and shape of the starting alloy particles.

It is not essential that the matrix metal component be removed in its entirety and a minor amount of matrix metal may remain even with extended leaching reaction times. Indeed, it may be desirable that the matrix metal component is not completely removed, since it may function as an additional electroactive material and/or as a dopant. Thus, the porous particles may comprise residual matrix metal component as defined above in an amount of no more than 40 wt %, more preferably no more than 30 wt %, more preferably no more than 25 wt %, more preferably no more than 20 wt %, more preferably no more than 15 wt %, more preferably no more than 10 wt %, and most preferably no more than 5 wt %, relative to the total weight of the particulate material. Optionally, the porous particles may comprise residual matrix metal component in an amount of at least 0.01 wt %, at least 0.1 wt %, at least 0.5 wt %, at least 1 wt %, at least 2 wt %, or at least 3 wt %, relative to the total weight of the particulate material.

As discussed above, a preferred matrix metal component is aluminium, and thus the porous particles may optionally comprise residual aluminium in an amount of no more than 40 wt %, more preferably no more than 30 wt %, more preferably no more than 25 wt %, more preferably no more than 20 wt %, more preferably no more than 15 wt %, more preferably no more than 10 wt %, and most preferably no more than 5 wt %, relative to the total weight of the particulate material. Optionally, the porous particles may comprise residual aluminium in an amount of at least 0.01 wt %, at least 0.1 wt %, at least 0.5 wt, at least 1 wt %, at least 2 wt %, or at least 3 wt %, relative to the total weight of the particulate material. Residual aluminium is well-tolerated since it is itself capable of absorbing and releasing metal ions during charging and discharging of a metal-ion battery, and it may further aid in making electrical contact between the silicon structures and between the silicon structures and the anode current collector.

The porous particles may comprise silicon and a minor amount of aluminium. For instance, the porous particles may comprise at least 60 wt % silicon and no more than 40 wt % aluminium, more preferably at least 70 wt % silicon and no more than 30 wt % aluminium, more preferably at least 75 wt % silicon and no more than 25 wt % aluminium, more preferably at least 80 wt % silicon and no more than 20 wt % aluminium, more preferably at least 85 wt % silicon and no more than 15 wt % aluminium, more preferably at least 90 wt % silicon and no more than 10 wt % aluminium, and most preferably at least 95 wt % silicon and no more than 5 wt % aluminium.

Optionally, the particulate material may comprise at least 1 wt % aluminium and no more than 99 wt % silicon, or at least 2 wt % aluminium and no more than 98 wt % silicon, or at least 3 wt % aluminium and no more than 97 wt % silicon.

The invention is demonstrated by the following examples and the accompanying figures, in which.

EXAMPLES

Figure 1:
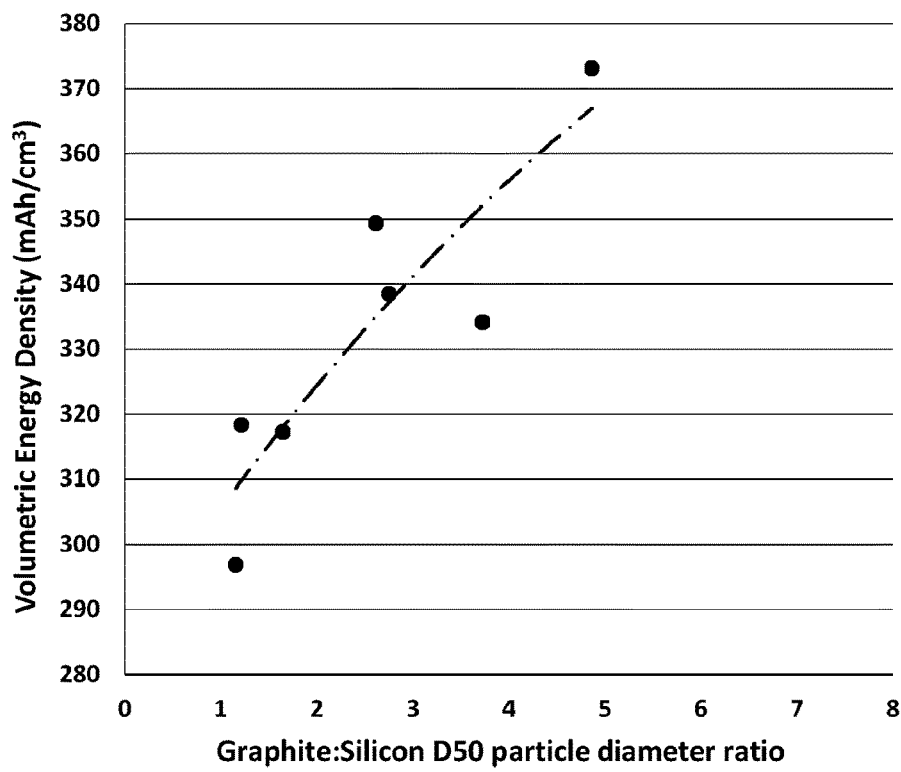
FIG. 1 is a plot of the Volumetric Energy Density in mAh/cm$^3$ vs the Graphite:Silicon $D_{50}$ particle diameter ratio for each of the half cells of Examples 7a to 7e and Comparative Examples 8a and 8b.
Figure 2:
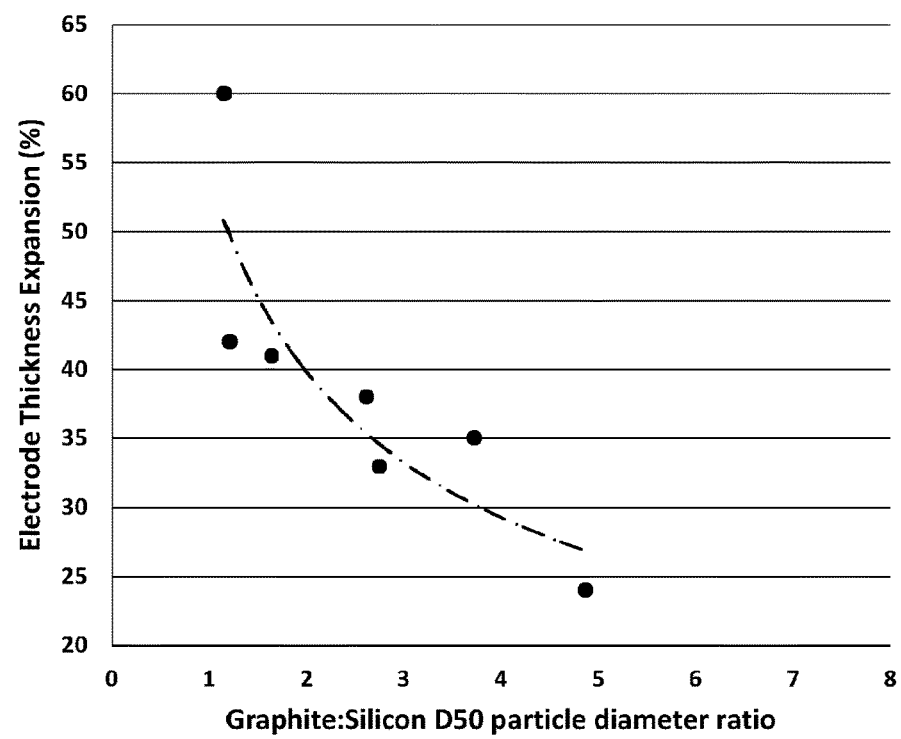
FIG. 2 is a plot of the Expansion in anode thickness (as a % increase of the initial thickness before lithiation) vs the Graphite:Silicon $D_{50}$ particle diameter ratio for each of the half cells of Examples 7a to 7e and Comparative Examples 8a and 8b.

General Procedure for Leaching of Alloy Particles

Gas atomised alloy particles (5 g) are slurried in deionised water (50 mL) and the slurry is added to a 1 L stirred reactor containing aqueous HCl (450 mL, 6 M). The reaction mixture is stirred at ambient up to 50° C. temperature for 20 minutes. The reaction mixture is then poured into deionised water (1 L) and the solid product is isolated by Buchner filtration. The product is dried in an oven at 75° C. before analysis.

Example 1

Particles of a silicon-aluminium alloy (12.9 wt % silicon) were leached according to the general procedure set out above. The alloy particles were obtained by gas atomisation of the molten alloy with a cooling rate of ca. 10$^5$ K/s followed by classification of the gas atomised product to obtain alloy particles having a $D_{50}$ particle diameter of 10.2 µm, a $D_{10}$ particle diameter of 5.2 µm, and a $D_{90}$ particle diameter of 18.4 µm. The alloy particles contained iron and other metallic impurities in a total amount of less than 0.5 wt %.

The porous particles obtained after the leaching process had a $D_{50}$ particle diameter of 10.4 µm, a $D_{10}$ particle diameter of 4.7 µm, and a $D_{90}$ particle diameter of 20 µm. The residual aluminium content of the porous particles was 4.7 wt % based on the total weight of the porous particles and the BET value was 114 m$^2$/g.

From mercury porosimetry measurements on a powder sample of the porous particles, a peak in the intra-particle pore distribution is observed at a pore diameter of 236 nm and the porosity is estimated at 85%.

Example 2—Process to Form Electrode with Active Layer Comprising PAA Binder

A 15 wt % Na-PAA polymer solution was prepared by dissolving 450,000 molecular weight PAA in water and adding NaOH to the PAA in a molar ratio of PAA:NaOH=1.43:1 so that 70% of the COOH groups of the PAA are neutralised. A dispersion of conductive carbons (a mixture of carbon black, carbon fibres and carbon nanotubes) in water was mixed in a Thinky® mixer with the porous particles of Example 1 and spheroidal MCMB graphite (D50=16.5 µm, BET=2 m$^2$/g). The Na-PAA solution was then mixed in to prepare a slurry with a solids content of 40 wt % and a weight ratio of the porous silicon particles:MCMB graphite:Na-PAA:conductive carbon of 10:75.5:6.5:8. The slurry was then coated onto a 10 µm thick copper substrate (current collector) and dried at 50° C. for 10 minutes, followed by further drying at 120-180° C. for 12 hours to thereby form an electrode comprising an active layer on the copper substrate.

Comparative Example 3

An electrode was made as in Example 2 except that non-porous Silgrain™ silicon powder (from Elkem) was used instead of the porous particles. The silicon powder had a $D_{90}$ particle diameter of 4.1 µm, a $D_{10}$ particle diameter of 2.1 µm, and a $D_{90}$ particle diameter of 7.4 µm. The BET value was 2 m$^2$/g and the particles had a silicon purity of 99.8 wt %.

Example 4—Production and Test of Half Cells

Coin half cells were made using circular electrodes of 0.8 cm radius from Example 2 or Comparative Example 3, with a Tonen® porous polyethylene separator, a lithium foil as the counter electrode and an electrolyte comprising 1M LiPF$_6$ in a 3:7 solution of EC/FEC containing 3 wt % vinylene carbonate. These half cells were used to measure the initial charge and discharge capacity and first cycle loss of the active layer and the expansion in thickness of the active layer at the end of the second charge (in the lithiated state). For expansion measurements, at the end of the first or second charge, the electrode was removed from the cell in a glove box and washed with DMC to remove any SEI layer formed on the active materials. The electrode thickness was measured before cell assembly and then after disassembly and washing. The thickness of the active layer was derived by subtracting the known thickness of the copper substrate. The volumetric energy density of the electrode, in mAh/cm$^3$, was calculated from the initial charge capacity and the volume of the active layer in the lithiated state after the second charge.

The half cells were tested by applying a constant current of C/25, (wherein "C" represents the specific capacity of the electrode in mAh, and "25" refers to 25 hours), to lithiate the electrode comprising the porous particles, with a cut off voltage of 10 mV. When the cut off is reached, a constant voltage of 10 mV is applied with a cut off current of C/100. The cell is then rested for 1 hour in the lithiated state. The electrode is then delithiated at a constant current of C/25 with a cut off voltage of 1V and the cell is then rested for 1 hour. A constant current of C/20 is then applied to lithiate the cell a second time with a 10 mV cut off voltage, followed by a 10 mV constant voltage with a cut off current of C/80. The results are shown in Table 1.

TABLE 1

| Electrode tested in half cell | First Cycle Loss (%) | Initial active layer thickness (before 1$^{st}$ charge) | Increase in active layer thickness at end of 2$^{nd}$ charge | Volumetric energy density of electrode (mAh/cm$^3$) |
|---|---|---|---|---|
| Example 2 | 15% | 41.1 µm | 32% | 457 |
| Comparative Example 3 | 9% | 46.4 µm | 67% | 446 |

The values in the table are averages from three test cells of each type. The expansion of the active layer in the half cell comprising the non-porous silicon powder is significantly more than for the electrode of example 3, leading to a reduced volumetric energy density even though the active layer of the comparative electrode has a higher initial density and a lower first cycle loss.

Example 5—Production and Test of Full Cells

Coin cells were made as in Example 4 except that the lithium counter electrode was replaced by an LCO cathode with a coat weight of 3.7 g/cm$^3$. Cell cycling tests were performed using CC-CV cycling between 4.2 and 3.0 V at a rate of C/5 with a 10 minute rest between cycles. The results are shown in Table 2.

TABLE 2

| Electrode tested in full cell | Specific Capacity on first discharge (mAh/g) | Capacity retention after ten cycles |
|---|---|---|
| Example 2 | 495 | 98% |
| Comparative Example 3 | 518 | 89% |

The capacity retention of the full cell of Example 5 comprising the electrode of Example 2 is significantly better than that for the full cell comprising the electrode of Comparative Example 1 comprising a non-porous silicon even though the comparative cell has a higher initial specific capacity.

Examples 6a, 6b and 6c—Process to Form Electrode with Active Layer Comprising CMC/SBR Binder Electrodes were prepared as in Example 2 except that Na-PAA was replaced by a 50:50 mixture of CMC:SBR in solution to prepare an active layer with the weight ratio of porous silicon particles:MCMB graphite:CMC:SBR:conductive carbon of 10:80:2.5:2.5:5. The active layers of the electrodes had the following densities:

Example 6a—uncalendered, 1.15 g/cc
Example 6b—calendered to a coat weight of 1.22 g/cc
Example 6c—calendered to a coat weight of 1.4 g/cc Half cells were made as in Example 4 but using the electrodes 6a, 6b and 6c. The volumetric energy density of the active layers in the lithiated state was measured as shown in Table 3.

TABLE 3

| Electrode tested in half-cell | Coating weight (g/cc) | Volumetric energy density of active layer (mAh/cm³) |
|---|---|---|
| Example 6a | 1.15 | 354 |
| Example 6b | 1.22 | 576 |
| Example 6c | 1.4 | 599 |

Optimum volumetric energy density was obtained for the electrode of Example 5c.

Examples 7a to 7e and Comparative Examples 8a and 8b

Example electrodes 7a to 7e and Comparative Example electrodes 8a to 8b were prepared as in previous examples but with different electrode formulations as detailed in the table below. The binder was a 1:1 mix of CMC and SBR. The electrodes comprised porous silicon particles obtained according to Example 1 except that different size classifications were used such that:

(i) Example 7a and Comparative Examples 8a to 8b comprised porous silicon particles with a $D_{50}$ particle diameter of 10 μm, a $D_{10}$ particle diameter of 4.3 μm, a $D_{98}$ particle diameter of 19.4 μm and a BET value of 117 m²/g;

(ii) Examples 7b to 7e comprised porous silicon particles with a $D_{50}$ particle diameter of 4.4 μm, a $D_{10}$ particle diameter of 0.7 μm, a $D_{98}$ particle diameter of 32.2 μm and a BET value of 125 m²/g.

The graphite particles used in the electrodes formulations were MCMB graphite powders with different particle size distributions purchased from Shanshan Technology, China (see table for $D_{50}$ particle diameters used in each electrode). The active layers of the electrodes had a coating weight 1.04 g/cm³. The dimensions of the silicon and carbon particles and the formulation of the electrode active layer are as shown in Table 4.

TABLE 4

| Electrode | Porous Si size $D_{50}$ (μm) | Graphite Size $D_{50}$ (μm) | Graphite:Si $D_{50}$ size ratio | Electrode formulation wt % ratio of: Si:Graphite:Binder:Carbon | Electrode coat density (g/cm³) |
|---|---|---|---|---|---|
| C. Ex 8a | 10 | 11.5 | 1.15 | 5:87.5:2.5:5 | 1.076 |
| C. Ex 8b | 10 | 12.1 | 1.21 | 5:87.5:2.5:5 | 1.01 |
| Ex 7a | 10 | 16.4 | 1.64 | 5:87.5:2.5:5 | 0.956 |
| Ex 7b | 4.4 | 11.5 | 2.6 | 5:87.5:2.5:5 | 1.086 |
| Ex 7c | 4.4 | 12.1 | 2.8 | 5:87.5:2.5:5 | 1.043 |
| Ex 7d | 4.4 | 16.4 | 3.7 | 5:87.5:2.5:5 | 1.01 |
| Ex 7e | 4.4 | 21.4 | 4.9 | 5:87.5:2.5:5 | 0.98 |

Half cells were made and tested as described in Example 3 except that the electrodes of Examples 7a to 7e and Comparative Examples 8a to 8b were respectively used as an anode in each cell. The test results of the half cells containing electrodes of Examples 7a to 7e and Comparative Examples 8a to 8b are summarised in Table 5.

TABLE 5

| Anode of half cell | First Cycle Loss (%) | Volumetric energy density of active layer (mAh/cm³) | Energy Density of 1st. Lithiation (mAh/g) | Energy Density of 1st. Delithiation (mAh/g) | Density of anode at end of $2^{nd}$ charge (g/cm³) | Increase in active layer thickness at end of $2^{nd}$ charge (%) |
|---|---|---|---|---|---|---|
| C. Ex 8a | 12.5 | 297 | 472 | 413 | 0.68 | 60 |
| C. Ex 8b | 11.7 | 318 | 478 | 422 | 0.72 | 42 |
| Ex 7a | 10.4 | 317 | 483 | 433 | 0.71 | 41 |
| Ex 7b | 13.8 | 349 | 478.1 | 412.4 | 0.79 | 38 |
| Ex 7c | 13.4 | 338 | 463.2 | 401.3 | 0.79 | 33 |
| Ex 7d | 12.9 | 334 | 469.1 | 408.9 | 0.77 | 35 |
| Ex 7e | 12.7 | 373 | 498 | 434.5 | 0.81 | 24 |

It has been found that the cells with a higher graphite:silicon $D_{50}$ particle diameter ratio have a higher volumetric energy density and a smaller expansion in electrode thickness.

The invention claimed is:

1. An electrode for a metal-ion battery, the electrode comprising an active layer in electrical contact with a current collector, wherein the active layer comprises:
   (i) a plurality of porous particles comprising at least 60 wt % of an electroactive material selected from the group consisting of silicon, germanium, tin, aluminium and mixtures thereof, wherein the plurality of porous particles has a $D_{50}$ particle diameter in a range of from 0.5 to 18 µm, and an intra-particle porosity in a range of from 30 to 90%; and
   (ii) a plurality of carbon particles selected from the group consisting of graphite, soft carbon, hard carbon and mixtures thereof, wherein the plurality of carbon particles has a $D_{50}$ particle diameter in a range of from 1 to 50 µm,
   wherein the plurality of carbon particles (ii) makes up at least 50% by weight of the active layer, and wherein a ratio of the $D_{50}$ particle diameter of the plurality of carbon particles (ii) to the $D_{50}$ particle diameter of the plurality of porous particles (i) is in a range of from 1.5 to 30.

2. An electrode according to claim 1, wherein the plurality of porous particles (i) comprises at least 60 wt % silicon or tin.

3. An electrode according to claim 1, wherein the plurality of porous particles (i) comprises at least 0.01 wt % of at least one of aluminium and germanium.

4. An electrode according to claim 1, wherein the plurality of porous particles (i) comprises a minor amount of one or more additional elements selected from the group consisting of antimony, copper, magnesium, zinc, manganese, chromium, cobalt, molybdenum, nickel, beryllium, zirconium, iron, sodium, strontium, phosphorus, tin, ruthenium, gold, silver, and oxides thereof.

5. An electrode according to claim 1, wherein the plurality of porous particles (i) has a particle size distribution span of 5 or less.

6. An electrode according to claim 1, wherein an average aspect ratio of the plurality of porous particles (i) is less than 3:1.

7. An electrode according to claim 1, wherein the plurality of porous particles (i) are spheroidal particles having an average sphericity ($S_{av}$) of at least 0.70.

8. An electrode according to claim 1, wherein the intra-particle porosity of the plurality of porous particles (i) is in a range of from 35 to 90%.

9. An electrode according to claim 8, wherein the intra-particle porosity of the plurality of porous particles (i) is in a range of from 40 to 90%.

10. An electrode according to claim 1, wherein the plurality of porous particles (i) has a pore diameter distribution having at least one peak at a pore size of less than 350 nm, as determined by mercury porosimetry.

11. An electrode according to claim 1, wherein the plurality of porous particles (i) has a pore diameter distribution having at least one peak at a pore size of more than 50 nm, as determined by mercury porosimetry.

12. An electrode according to claim 1, wherein the plurality of porous particles (i) has a BET surface area of less than 300 m²/g.

13. An electrode according to claim 1, wherein the plurality of carbon particles (ii) is a plurality of graphite particles.

14. An electrode according to claim 1, wherein the $D_{50}$ particle diameter of the plurality of carbon particles (ii) is at least 2 µm and no more than 45 µm.

15. An electrode according to claim 1, wherein the plurality of porous particles (i) makes up from 1 to 30 wt % of the active layer.

16. An electrode according to claim 1, wherein the active layer has an inter-particle porosity of at least 2% and no more than 30%.

17. An electrode according to claim 1, wherein the active layer has a density in a range of from 1 to 2 g/cm³.

18. An electrode according to claim 1, wherein a percent average cross-sectional area of the active layer occupied by the plurality of porous particles (i) is in a range of from 1% to 25%.

19. An electrode according to claim 1, wherein a percent average cross-sectional area of the active layer occupied by inter-particle pores of the active layer is in a range of from 2% to 30%.

20. An electrode according to claim 1, wherein the active layer comprises at least one of a binder and one or more conductive additives.

21. An electrode according to claim 1, wherein the active layer has a thickness in a range of from 15 µm to 2 mm.

22. An electrode composition comprising:
   (i) a plurality of porous particles comprising at least 60 wt % of an electroactive material selected from the group consisting of silicon, germanium, tin, aluminium and mixtures thereof, wherein the plurality of porous particles has a $D_{50}$ particle diameter in a range of 0.5 to 18 µm, and an intra-particle porosity in a range of from 30 to 90%; and
   (ii) a plurality of carbon particles selected from the group consisting of graphite, soft carbon, hard carbon and mixtures thereof, wherein the plurality of carbon particles has a $D_{50}$ particle diameter in a range of from 1 to 50 µm,
   wherein the plurality of carbon particles makes up at least 50% by weight of the electrode composition, based on solids content of the electrode composition, and wherein a ratio of the $D_{50}$ particle diameter of the plurality of carbon particles (ii) to the $D_{50}$ particle diameter of the plurality of porous particles (i) is in a range of from 1.5 to 30.

23. An electrode composition according to claim 22, wherein the plurality of porous particles (i) makes up at least 1 wt % and no more than 30 wt % of the electrode composition, based on the solids content of the electrode composition.

24. An electrode composition according to claim 22, comprising at least one of a binder and one or more conductive additives.

25. An electrode composition according to claim 22, in the form of a slurry, wherein the electrode composition further comprises a solvent.

26. A rechargeable metal-ion battery comprising:
   (i) an anode, wherein the anode comprises an electrode, wherein the electrode comprises an active layer in electrical contact with a current collector, wherein the active layer comprises:
      (a) a plurality of porous particles comprising at least 60 wt % of an electroactive material selected from the group consisting of silicon, germanium, tin, aluminium and mixtures thereof, wherein the plurality of porous particles has a $D_{50}$ particle diameter in a range of from 0.5 to 18 µm, and an intra-particle porosity in a range of from 30 to 90%; and (b) a plurality of carbon particles selected from the group consisting of graphite, soft carbon, hard carbon and mixtures thereof, wherein the plurality of carbon particles has a $D_{50}$ particle diameter in a range of from 1 to 50 μm, wherein the plurality of carbon particles (ii) makes up at least 50% by weigh of the active layer, and wherein a ratio of the $D_{50}$ particle diameter of the plurality of carbon particles (ii) to the $D_{50}$ particle diameter of the plurality of porous particles (i) is in a range of from 1.5 to 30;

(ii) a cathode comprising a cathode active material capable of releasing and reabsorbing metal ions; and (iii) an electrolyte between the anode and the cathode.

27. An electrode according to claim 1, wherein the electroactive material is silicon.

28. An electrode composition according to claim 22, wherein the electroactive material is silicon.

* * * * *